(12) United States Patent
Rouaix et al.

(10) Patent No.: US 8,423,431 B1
(45) Date of Patent: Apr. 16, 2013

(54) LIGHT EMISSION GUIDANCE

(75) Inventors: Francois M. Rouaix, Seattle, WA (US);
Felix F. Antony, Issaquah, WA (US);
Cynthia L. Elliott, Seattle, WA (US);
Jeffrey P. Bezos, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 569 days.

(21) Appl. No.: 12/182,017

(22) Filed: Jul. 29, 2008

Related U.S. Application Data

(60) Provisional application No. 61/015,551, filed on Dec. 20, 2007.

(51) Int. Cl.
*G06F 17/60* (2006.01)

(52) U.S. Cl.
USPC .............................................. 705/28; 705/29

(58) Field of Classification Search .................. 345/158; 705/8, 28; 713/176
See application file for complete search history.

(56) References Cited

U.S. PATENT DOCUMENTS

| | | | |
|---|---|---|---|
| 6,452,544 B1 * | 9/2002 | Hakala et al. | 342/357.31 |
| 7,249,257 B2 * | 7/2007 | Brundage et al. | 713/176 |
| 8,055,296 B1 * | 11/2011 | Persson et al. | 455/556.1 |
| 2007/0016460 A1 * | 1/2007 | Weiss | 705/8 |
| 2008/0007400 A1 | 1/2008 | Murphy | |
| 2008/0048979 A1 * | 2/2008 | Ruttenberg | 345/158 |
| 2008/0183328 A1 * | 7/2008 | Danelski | 700/216 |

OTHER PUBLICATIONS http://replay.waybackmachine.org/20071217200348/http://www.ipti.net/lightbasedpicktolight.php stored as: IPTI light based pick to light.pdf, snapshots were taken on Oct. 16, 2007, 2 pages.
http://replay.waybackmachine.org/20071217195909/http://www.ipti.net/puttolight.php stored as: IPTI put to light.pdf, snapshots were taken on Oct. 16, 2007, 2 pages.
http://replay.waybackmachine.org/20071217195854/http://www.ipti.net/laserpick.php stored as: IPTI laser directed pick and put.pdf, snapshots were taken on Oct. 16, 2007, 2 pages.

\* cited by examiner

*Primary Examiner* — Scott Zare
*Assistant Examiner* — Talia Crawley
(74) *Attorney, Agent, or Firm* — Robert C. Kowert; Meyertons, Hood, Kivlin, Kowert & Goetzel, P.C.

(57) ABSTRACT

A visible-light based display system may be used to project visual guidance to picking and/or stowing agents in a materials handling facility dependent on their current location. The system may comprise a plurality of fixed-location display devices and/or mobile display devices coupled to a control system. The control system may send messages to particular ones of the display devices for projection of visual guidance usable to direct an agent to a particular inventory area in which an item is to be stowed or from which an item is to be picked, to identify a particular position within an inventory area, and/or to identify a particular item stored within an inventory area. The messages may include location, position, and/or descriptive information associated with an item to be stowed or picked. The projected visual guidance may include light or laser beams, text, graphics and/or images, and may be agent-specific, item-specific, and/or order-specific.

57 Claims, 13 Drawing Sheets

LIGHT EMISSION GUIDANCE

RELATED APPLICATIONS

This application claims benefit of U.S. Provisional patent application No. 61/015,551 filed Dec. 20, 2007, incorporated herein by reference.

BACKGROUND

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

The increasing scope of electronic commerce, fueled by the ubiquity of personal computers, the Internet, and the World Wide Web, has resulted in striking changes to the number of options open to customers to shop and pay for items. Virtual storefronts allow customers to view item information including features, specifications, appearance, pricing and availability from their own home or office. Such virtual storefronts have become commonplace even among wholesalers and retailers who may still maintain physical customer presences (i.e., brick-and-mortar storefronts). Additionally, many companies conduct business exclusively through virtual storefronts without maintaining any other form of customer presence, such as a physical storefront. Electronic commerce using virtual storefronts offers many advantages, such as lower cost overhead (e.g., due to lack of sales personnel, lack of physical storefronts, highly automated ordering processes, etc.), and a potential customer base limited only by the availability of communication networks.

When a customer places an order, one or several inventory items specified in the order are retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, International Standard Book Number (ISBN), or other designation (including proprietary designations) may be stored together within inventory. In an inventory environment that includes a large number of many different items, it may be highly inefficient for a single employee to physically locate and pick every item for a given order. For example, different items specified in a given order may be stored at mutually remote locations within the inventory facility, which would require a single picking agent to traverse a long path through the facility.

In order to make better use of inventory stocking space, it may be desirable to stock different items together in a single storage location or stocking area. While increasing the efficient use of inventory space, such co-location of different items may increase the difficulty, and thus the time, of identifying and picking a particular item. When picking items from inventory, the picking agent may generally need to examine some number of co-located items in order to determine the specific item to pick. This can be time consuming in situations where numerous similar items are stored together. Additionally, several similarly titled or described items may be stored in a single inventory area, increasing the difficulty of identifying any particular item. For instance, if several compact discs (CDs) are entitled "Greatest Hits" and stored together, a picking agent may have to read the full title for each item in turn to identify the correct item. The extra time this requires may be significant when multiplied across the large number of orders fulfilled by a typical facility. Similarly, in a facility handling items for rent or sale, there may be a large number of similar-looking items, such as Digital Versatile Discs (DVDs), stored together. A picking agent may have difficulty identifying particular DVDs from among multiple DVDs in a single inventory location. Again, any extra time required to correctly identify a DVD becomes significant, since each DVD may be stored and picked many times, as it is rented and returned.

Some materials handling facilities include a pick-to-light system, in which lights mounted on shelves or racks in inventory are programmed to light up to indicate a bin or other storage area in which items having a given product identifier are stored. Such systems may include support for put-to-light operations, as well (e.g., lighting up a container in which items should be stored). However, such systems may not be suitable for use in facilities that store different items together in a single inventory area, as they still require the agent to manually inspect the items before picking.

Figure 1:
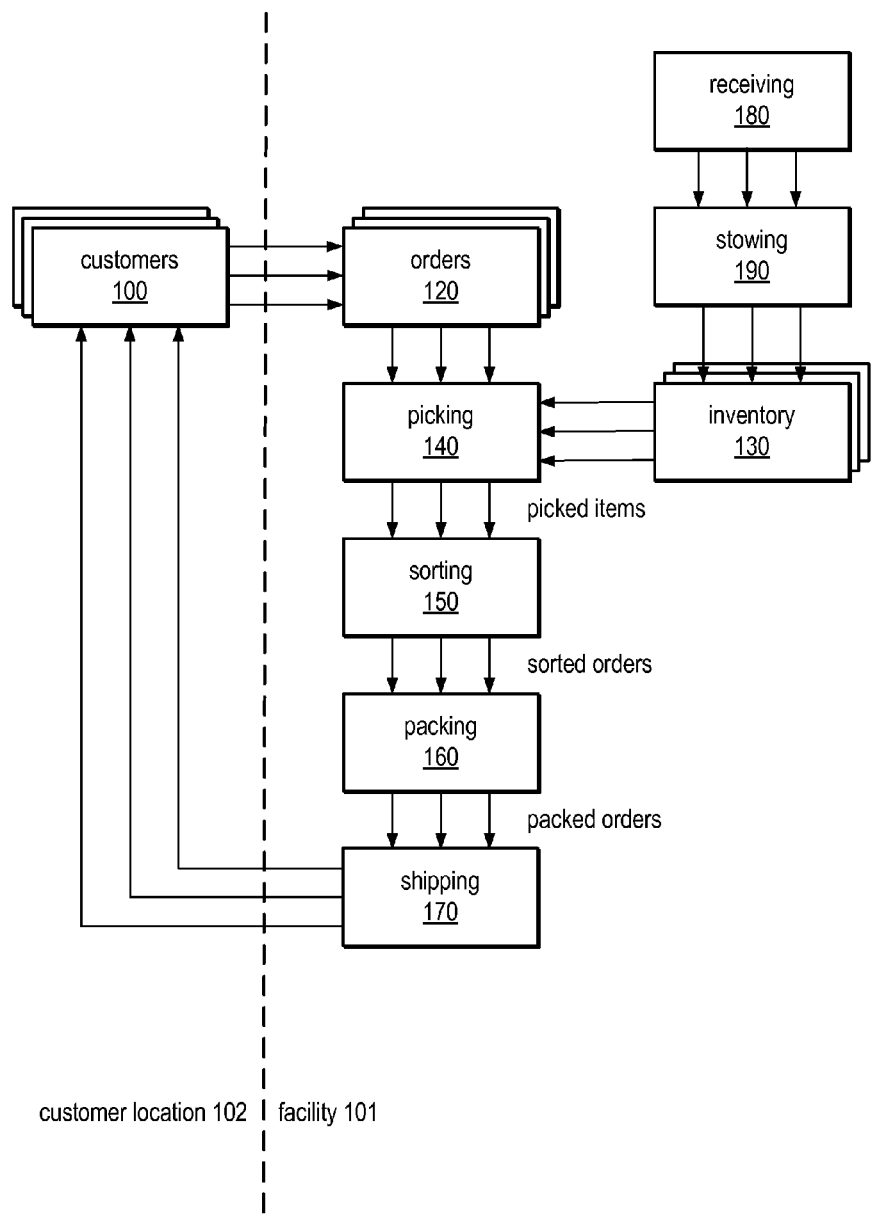
FIG. 1 illustrates a broad view of the operation of a materials handling facility, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In a materials handling facility, multiple, different product items may be stored together in a single inventory area, such as a shelf, rack, bin, or drawer. For example, a facility may store items such as books, CDs, DVDs, electronic devices, clothing, toys, hardware, materials, and/or other items together in various combinations within each inventory area. Items may be stored in inventory areas by an agent, either randomly, pseudo-randomly or according to one or more guidelines, with an inventory area selected for each item automatically, such as by software executing on a control system, in some embodiments. An agent or control system may record the to selected inventory area for each item in a product database, which may include a description, inventory location number, or other data representing the inventory area in which the item is to be stored, along with position and/or descriptive information for the item, indexed by a product identification code, for example. A picking agent, i.e., an agent engaged in a picking operation, may be provided instructions to locate and obtain a particular item from an inventory area. The instructions may include the stored location, position, and/or descriptive information for the item, and may be usable by the picking agent to locate and identify the item to be obtained, or "picked." Similarly, a stowing agent, i.e., an agent engaged in a stowing operation, may be provided instructions to stow an item in a particular location and/or position in a given inventory area. Note that in different embodiments, the term "agent" may refer to a human person working in the materials handling facility or to an automated piece of equipment configured to perform the operations of an agent, as described herein. For example, in some embodiments, a robotic device may perform the role of a stowing agent or a picking agent. Note also that in various embodiments, an individual agent may act as a picking agent, a stowing agent, or an agent of another operation in the facility at different times, or may perform two or more roles while traversing the facility (e.g., picking some items and stowing others as they traverse the facility).

A visible light emission system, such as a coherent light based display system, a laser-based display system, a video projection system, or another light-based display system may be used to facilitate operations in such a materials handling facility, including, but not limited to, stowing and picking operations. Such a display system may project information, visible to an agent in the facility, to guide the agent to a particular location within the facility to perform a picking operation, a stowing operation, or another operation at that location. For example, if an agent is to pick a copy of the book *War and Peace*, a control system in the facility may be configured to determine a path from the agent's current position to an inventory area in which a copy of the book is stored. The control system may provide information to the display system indicating the determined path, and the display system may project visual guidance (e.g., on the floor, ceiling, or walls) near the agent to direct the agent to the inventory area and to assist the agent in identifying the book once the agent reaches the area. For example, a laser-based display device or video projector may be configured to emit or project a display that includes a light beam, a laser beam, text-based information, graphics, or photographic images to help the agent locate the item and/or the inventory area in the facility. The projected display may provide the agent with directions for reaching the inventory area (e.g., "walk 500 yards, then turn left") and/or information usable to identify the book (e.g., a photographic image of the book, or a description, "large, red book"), in various embodiments. Once the agent reaches the inventory area and identifies the book, the agent may scan an identifier of the book to indicate to the control system that the item has been picked and/or to verify that the correct item was picked.

In some embodiments, emission from a light-based display system may be used to provide visual guidance that includes context-sensitive instructions and/or information to agents in the facility. For example, a laser-based display system or video projection system may be used to project instructions and other information to picking and/or stowing agents in a materials handling facility dependent on their current location and/or the progress of the task. According to different embodiments, the information projected by such display devices may be agent-specific, item-specific, and/or order-specific, as described in more detail below.

A light-based display system may include a plurality of display devices including devices mounted at fixed locations within the facility and/or mobile devices, similar to portable display systems, in different embodiments. For purposes of this disclosure, the terms "laser-based display system" and "laser-based display device" will be used in describing some embodiments for ease of explanation. However, any type of visible light emission system and/or display device may be used in various embodiments. Accordingly, the use of a laser-based display system and laser-based display device shall not be construed as limiting. A display system that includes a plurality of display devices coupled to a control system may in some embodiments be re-configurable through software when the arrangement of the inventory changes, when items are added to or deleted from the set of items handled in the facility, when guidelines for the storage of items change, or when other physical configuration parameters change. Such a system may be readily applied to a facility employing random stowing of items, or pseudo-random stowing of items, as described herein.

In embodiments in which a visible light emission system is a laser-based display system, the laser-based display system may employ a vector-based laser technology, a raster-based laser technology, or any other type of laser technology, in different embodiments. Alternative embodiments may utilize other types of technology (i.e., a light-based technology other than a laser-based technology). A control system may send messages to one or more of a plurality of display devices for the projection of visual guidance, such as instructions and other information usable to assist an agent performing various tasks in the facility. For example, the control system may send messages to particular ones of the display devices to initiate the projection of visual guidance usable to direct an agent to a particular inventory area in which an item is to be stowed or from which an item is to be picked. The projected visual guidance may be similar to those used in entertainment shows that display laser-generated graphics or other images on a surface or in the air, sometimes through theatrical smoke or fog. The displays may also include individual light beams or laser beams, and/or general-purpose text. The selection of devices for a given facility and/or display may be dependent in part on the complexity of signals that need to be supported. For example, devices supporting fast signal movement may be required for applications involving complex displays. The control system may also be used to control a number of moveable mirrors for projecting the light from the display devices into the desired image and/or to reflect the light to the desired location. In such embodiments, the mirrors may be controlled to move or oscillate using a galvanometer.

The information projected by the display system may include an indication of at least a portion of a path to an inventory area targeted for a stowing or picking operation. In some embodiments, the control system may be configured to determine the current location of a picking or stowing agent and may determine the shortest path from the agent's current location to the targeted inventory area. In other embodiments, the control system may determine the current location of a picking or stowing agent and may determine a path from the agent's current location to the targeted inventory area such that the path does not cross the path of another agent in the facility, or such that the agent is not directed to a given inventory area when another agent is working in the same inventory area. Still further, the control system may determine a path such that the agent is not directed to enter or cross through an area that is quarantined, blocked-off, or otherwise inaccessible. The control system may in some embodiments be configured to send messages, including path data, to one or more of a plurality of display devices. The messages may initiate the projection of path information (e.g., a light beam, a laser beam, text-based instructions, symbols, and/or images). The projected path information may be directed to the floor, a mirror, a wall, a ceiling, a storage location (e.g., a shelving unit, container, or bin), on an item itself, or in another location visible to the agent to direct the agent to the targeted inventory area. In some embodiments, the control system may send a series of such messages to be presented to the agent as the agent traverses the facility to reach the targeted inventory area.

Once the agent reaches the targeted inventory area, the control system may be configured to send additional messages to particular ones of the display devices to initiate the projection of visual guidance usable to identify a particular position or location within an inventory area, such as for a stowing operation. For example, the control system may send a message that includes position data to the display device nearest the targeted inventory area to initiate projection of a light beam, a laser beam, text-based display, or image indicating the position in the targeted area at which an item is to be stowed. Similarly, in a picking operation, the control system may send a message that includes position data to the display device nearest the targeted inventory area to initiate projection of a light beam, a laser beam, text-based display, or image indicating the position of an item to be picked from the targeted inventory area. The display device may be configured to project this information at a location visible to the agent so that the agent may locate the item to be picked. For example, the information may be projected on a mirror, wall, floor, or shelving unit near where the item is stored, on an item itself, etc.

In some embodiments, the control system may send messages to particular or selected ones of the display devices to initiate the projection of visual guidance usable to identify a particular item within an inventory area that is to be picked. For example, such a message may include a description of the item, including, for example, the name or title of the item, its color, a pattern associated with the item, the dimensions and/or shape of the item, or a visual representation of the item, in different embodiments. Such a description may be presented using various formats, such as text, graphics, and/or photographic images. The display device may be configured to project this visual guidance at a location visible to the agent so that the agent may identify the item to be picked.

The control system may in various embodiments be configured to send instructions to the display devices to effect the selection of one of the display devices to project visual guidance, the orientation of one of the display devices when projecting the visual guidance, a projection angle of one of the display devices, a format of a projection of visual guidance, a duration of a projection of the visual guidance, the initiation of a projection of the visual guidance, or the cessation of a projection of the visual guidance. These instructions and/or other messages may be encoded according to the specifications of the display device.

The display devices employed in a materials handling facility may utilize any of various display technologies, including, but not limited to, a vector-based display technology, a raster-based display technology, and a MicroElectro-Mechanical Systems (MEMS) technology. In some embodiments the display devices and/or control system may be coupled to one or more sensors, scanners, Radio Frequency Identification (RFID) readers, or cameras usable for calibrating the locations of the display devices and/or the location of the agents in the facility with respect to one or more references within the facility whose locations are known. The control system may also be coupled to a product database or other data store configured to store respective location information associated with each item handled within the facility, and the control system may be configured to store this location information for each item. The location information for each item may indicate a location at which the item was stowed or a location at which the item is to be stowed (e.g., the location at which the control system determines the item should be stowed, whether or not the stowing operation has been completed). In such embodiments, the control system may be configured to access the stored location information for a given item when determining the targeted inventory area and when determining a path to the targeted inventory area. Such a product database may also be configured to store position and/or descriptive information, which may be accessed by the control system and used to generate the various visual guidance messages to be sent to the display devices for projection to the agents.

The system described herein may in some embodiments be configured to present all of the information needed to reach a targeted inventory area (e.g., path information), to identify a given position within the targeted inventory area (e.g., position information), and/or to identify a given item within the targeted inventory area (e.g., descriptive information) at the same time (e.g., at the beginning of a stowing or picking operation). In other embodiments, different types and/or amounts of information may be presented to an agent as the stowing or picking operation progresses. For example, only path information may be presented to an agent until the agent reaches a targeted inventory area, and then additional information may be presented. In some embodiments, a light-based display system may be used in conjunction with one or more other types of communication devices (e.g., handheld communication devices, RFID tags and/or readers, scanners, and/or cameras) to carry out the various operations of the materials handling facility. For example, in some embodiments, the control system may be configured to use information transmitted from such communication devices to determine the current location of agents in the facility, as described in more detail below. In such embodiments, the system may be configured to adapt the information presented to the agent dependent on the agent's current location.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of the control system, product database, display devices, and/or other communication devices).

An order fulfillment facility, or another type of materials handling facility, may include an inventory management system employing a light-based display system in various operations of the facility. FIG. 1 illustrates a broad, exemplary view of the operations of one such facility, which, in one embodiment, may be configured to utilize a light-based display system as described herein. In this example, multiple customers 100 may submit orders 120 to the distributor of the items in the facility, where each order 120 specifies one or more items (not shown) from inventory 130 to be shipped to the customer that submitted the order. In some embodiments, the orders may be submitted locally, such as by a customer that is present at the facility. In other embodiments, orders may be submitted remotely, such as through a network (e.g., Internet) based ordering system, a telephone-based ordering system, or physical mail (e.g., a catalog ordering system), among other possibilities (not shown). This is illustrated in FIG. 1 by the dashed line separating customers 100 (in customer location 102) from the other operations (located in facility 101). Note that a customer 100 may in various embodiments be a consumer, a distributor, a retailer, a buyer, a seller, or any other entity that places an order 120 to be fulfilled at facility 101. Each of these different types of customers may interact with facility 101 using a different customer interface and/or service model. For example, rather than placing an order remotely and having it shipped to them, some types of customers may visit the facility (which may be a warehouse or retail outlet) and may place an order in person (e.g., using a computer terminal or other communication device). Other types of customers (e.g., distributors or retailers) may place orders on behalf of other types of customers (e.g., retailers or consumers), in various embodiments.

To fulfill the customer orders 120, the one or more items specified in each order may be retrieved or "picked" from inventory 130 (which may also be referred to as stock storage) in the materials handling facility, as indicated by block 140. In some embodiments, items may be identified from inventory based on information presented to facility personnel (sometimes called agents) using a light-based display system, as described herein. In various embodiments, the information presented may include directions to a particular location within the facility, a description of the items to be picked (which may include dimension information and/or pattern information associated with the items), and/or position information for the items within a given inventory area. Picked items may be delivered to one or more stations (e.g., sorting stations, packing stations, re-binning stations, shipping stations) in the materials handling facility for sorting 150 into their respective orders, packing 160, and finally shipping 170 to the customers 100. Note that a picked, packed and shipped order does not necessarily include all of the items ordered by the customer; a shipped order may include only a subset of the ordered items available to ship at one time from one inventory-storing location. Additionally, if a customer 100 is present at the facility, the picked item(s) may be delivered directly to the customer 100 without being packed and/or shipped, or the customer 100 may be directed to pick them item(s) from the inventory areas of the facility, rather than having them picked for the customer by an agent of the facility, in various embodiments.

A materials handling facility typically also includes a receiving operation 180 for receiving shipments of inventory items (i.e., stock) from various vendors and a stowing operation, illustrated as stowing 190, for placing the received stock into stock storage (inventory 130). In some embodiments, stowing 190 may involve stowing or placing an item in a location within inventory 130 selected by a control system (e.g., randomly, pseudo-randomly, or according to various guidelines for stowing similar or different items within the facility). In some embodiments, stowing 190 may involve applying positional placement guidelines when adding items to one of the plurality of inventory areas in inventory 130. For example, a positional placement guideline may specify that items should always be added to an inventory area to the right of items already stored in the area, or that items should be placed in inventory areas in order of size (e.g., with the largest item on one side of the area and successively smaller items placed next to each other toward the other side of the area). In other embodiments, items may be stored together based on their distinguishability from each other. For example, in some embodiments, the control system may be configured to automatically determine one or more inventory areas in which to stow an item such that the item may be easily distinguishable from other co-located items. A light-based display system may in some embodiments be used to direct an agent to a particular location and/or position within the inventory area in which an item is to be stowed, as described herein.

In some embodiments, a materials handling facility may receive an order for an item not currently in the facility's inventory. When the item is received, the order may then be filled and shipped. When an order is received for an item before the item has been received at a materials handling facility, the received item may or may not be stowed into inventory before being matched up with the order and shipped out, according to various embodiments. The receipt of the item at the facility may trigger the fulfillment process for a pending order. Note that the various operations of a materials handling facility may be located in one building or facility, or alternatively may be spread or subdivided across two or more buildings or facilities.

Positional item information and/or descriptive item information, as described herein in various embodiments, may be used to locate a given item to be picked from inventory 130. For example, in some embodiments, facility personnel (i.e., agents) who retrieve ordered items from inventory 130, may be presented with position and/or descriptive information to quickly locate specific items in inventory 130 without, for example, having to read an item label, such as a book or CD title. This position and/or descriptive information may be presented to the agents using a light-based display system. For example, one or more laser-based display devices or video projectors may be mounted within the facility and may project visual guidance including position and/or descriptive information on a mirror, on a wall, on the floor, or in another location visible to the agents.

A light-based display system as described herein in various embodiments, may be utilized in several areas of a materials handling facility such as during stowing 190, picking 140, sorting 150, packing 160, and shipping 170. For example, in some embodiments a light-based display system may present item information and/or directions to agents who retrieve ordered items from inventory 130, so that they may quickly locate and identify specific items in inventory 130. Sorting agents, who sort items collected by picking agents, may utilize a light-based display system to speed the process of grouping items by order. For example, a laser-based display system or video projection system may present to the agent a list, descriptions, or images of the items that are to be grouped together.

A light-based display system may also aid packing agents to efficiently select an appropriately sized container for shipment, to locate the correct hopper or container being used to ship a group of items, to direct a group of items to the correct packing station, or to perform other operations, according to various embodiments. In yet another embodiment, position information and/or descriptive information may be used in a receiving station of a materials handling facility. For example, agents in a receiving operation may be presented with instructions or images to direct them to place received items on a particular pallet or conveyor belt, or to deliver the items to a particular inventory area within the facility for unpacking and storage.

The arrangement and order of operations illustrated by FIG. 1 is merely one example of many possible embodiments of the operation of a materials handling facility utilizing a light-based display system. Other types of materials handling, manufacturing, or order fulfillment facilities, may include different, fewer, or additional operations and resources, according to different embodiments.

Figure 2:
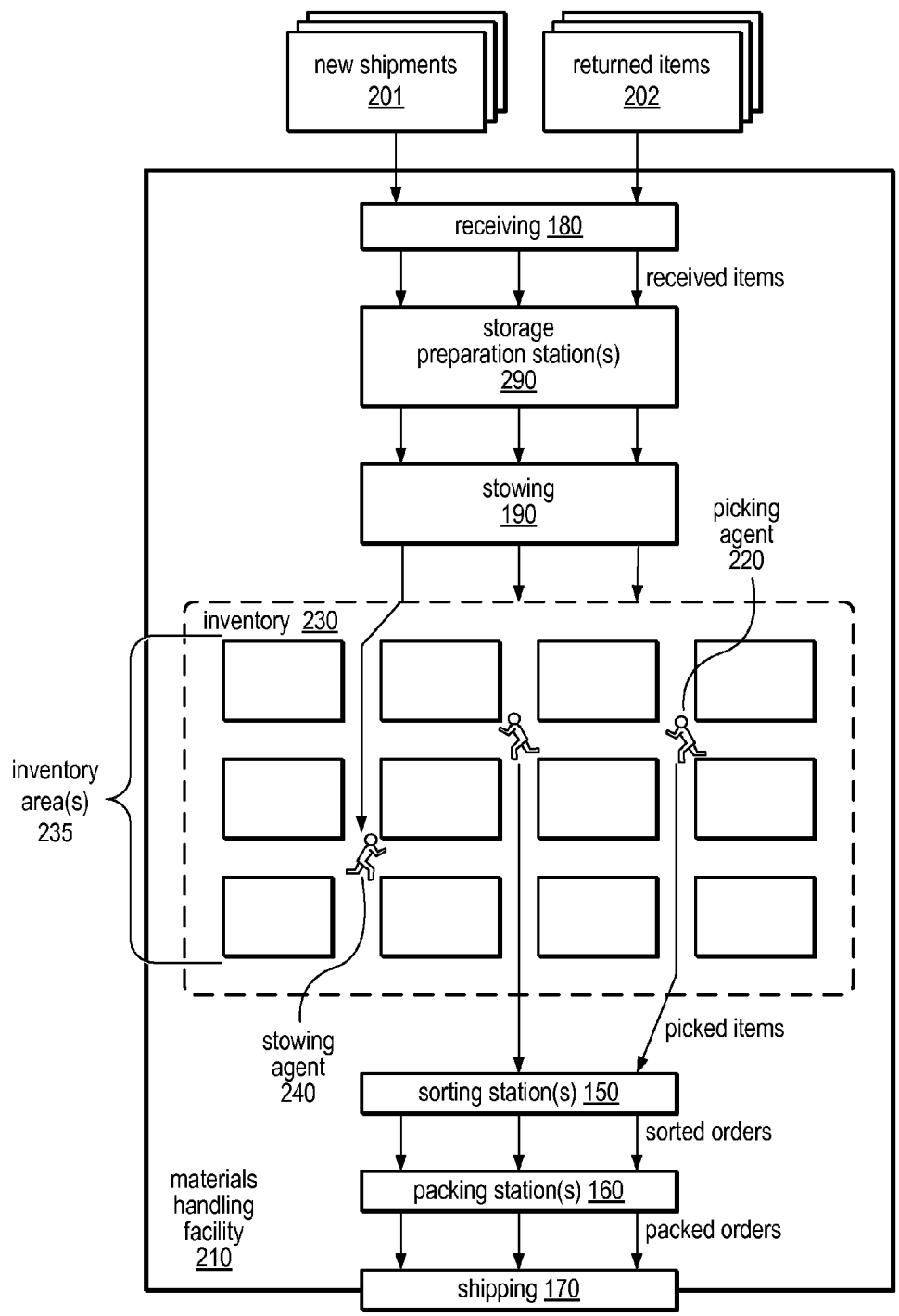
FIG. 2 illustrates one embodiment of an exemplary physical layout of a materials handling facility.

The stations of a materials handling facility may be arranged in many different configurations, according to various embodiments. FIG. 2 illustrates a physical layout for an exemplary materials handling facility 210, according to one embodiment. At any time, one or more picking agents 220 may each be picking items (not shown) from inventory 230 to fulfill portions or all of one or more orders, and/or one or more stowing agents 240 may be placing items in inventory 230. According to some embodiments, a light-based display system may present information to picking agents 220 and stowing agents 240 to increase speed and efficiency when locating items from among different items that may be co-located in a single inventory area 235 and when stowing items within an inventory area 235. For example, a light-based display system may present a picking agent 220 with instructions to direct the agent to a particular inventory area 235, and additional information (e.g., position information, pattern information, dimension information, or other descriptive information) to assist the agent in locating one or more items from the inventory area 235. Similarly, a light-based display system may present instructions to a stowing agent 240 to direct the agent to a particular inventory area 235, and may present additional information (e.g., text or image information) to assist the agent in locating the specific position within the inventory area 235 in which an item is to be placed.

After obtaining items from inventory 230, picking agents 220 may transfer those items to sorting stations 150, and may be directed to the appropriate sorting station 150 by instructions presented by a light-based display system, according to one embodiment. It should be understood that not every facility may include both sorting and packing stations. In certain embodiments agents may transfer picked items directly to a packing station, such as packing station 160, and may be directed to a particular packing station using a display presented by a light-based display device. In other embodiments, agents may transfer picked items to a combination sorting and packing station (not illustrated). This may result in a stream and/or batches of picked items for multiple incomplete or complete orders being delivered to a sorting station 150 for sorting into their respective orders for packing 160 and shipping 170, according to one embodiment illustrated by FIG. 2. Note that portions of an order may be received at different times, so sorting 150 and packing 160 may have to wait for one or more items for some orders to be delivered to the sorting station(s) 150 before completion of processing of the orders. The stream or batches of incoming picked items may be sorted into their respective orders at the sorting station(s) 150. While, in some embodiments, automated sorting may be utilized, such as through the use of Crisplant® or Eurosort® sorters, in other embodiments sorting may be performed manually. In yet other embodiments, both manual and automatic sorting may be used in combination. Once an order is completed at a sorting station 150, the order may be ready to proceed to a packing station 160 to be packaged for shipping 170.

Figure 9A:
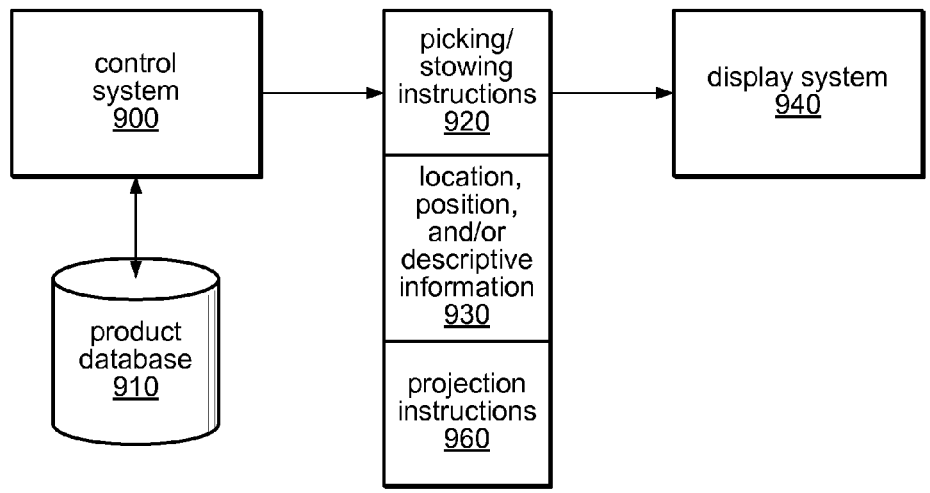
FIGS. 9A-9B are block diagrams illustrating various embodiments of the delivery of instructions and other information from a control system to a communication device and/or a display system.
Figure 9B:
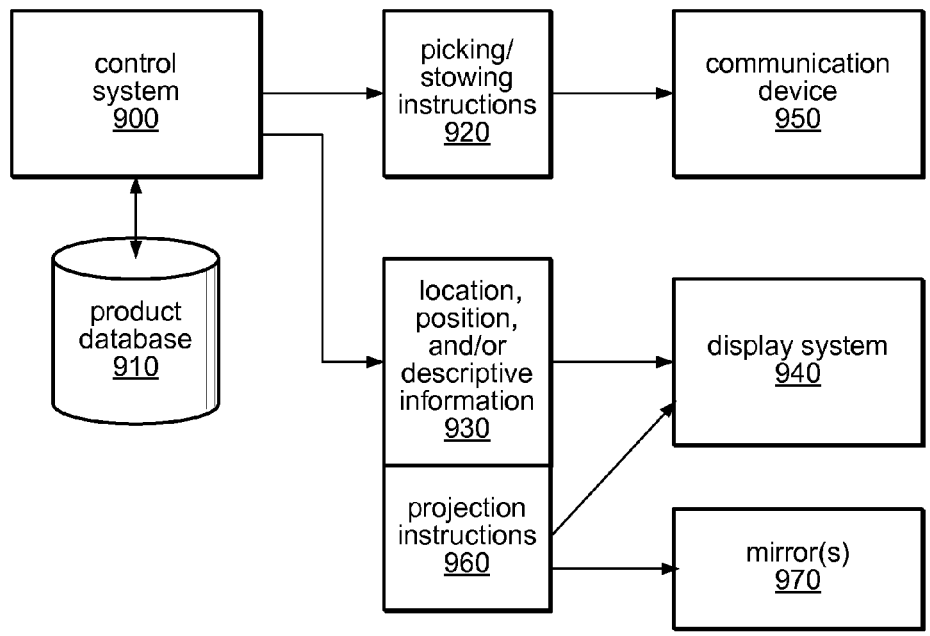

An order fulfillment facility such as materials handling facility 210 may implement an order fulfillment control system, or control system for short, as part of its overall inventory management system. A control system (such as illustrated in FIGS. 9A and 9B and discussed below) may include hardware and software configured for assisting and/or directing agents in the materials handling facility 210 in fulfilling customers' orders. For example, in some embodiments, such a control system may transmit information to one or more display devices, which may present instructions and other information to a picking agent 220 or a stowing agent 240.

Items in inventory 230 may be marked or tagged with a bar-code, RFID tag, UPC, SKU code, ISBN, serial number, and/or other designation (including proprietary designations) to facilitate operations of materials handling facility 210, including, but not limited to, picking 140, sorting 150 and packing 160. These designations, or codes, may identify items by type, and/or may identify individual items within a type of item. The control system may also include, or may be used in conjunction with, handheld, mobile and/or fixed scanners or scanning devices that may be able to scan the marks or tags on individual items and/or inventory areas 235 to determine and record an identifier of an item and/or an item location. In some embodiments, a control system may be configured to access location, position and/or descriptive information for items (e.g., from a product database or other data store) and may provide this information to picking agents 220 along with other information indicating items to be obtained from inventory, as will be described in more detail below.

The control system may in some embodiments be configured to determine the location and/or position of a picking agent 220 or a stowing agent 240 (e.g., using an indirect asset tracking device or other communication device worn or carried by the agent) and may generate stowing or picking instructions for the agent that are dependent on the agent's current location within inventory 230. For example, the control system may transmit messages including instructions for the agent to a display device that is near the agent, and this display device may display information suitable for directing the agent from their current location to the location of an item to be picked. In some embodiments, the display device may project visual guidance to the agent by projecting a graphical or text-based image on the floor in front of the agent (e.g., "walk straight ahead 5 yards, then turn right," or an arrow pointing in the direction that the agent should walk). In other embodiments, the display device may project visual guidance to the agent by projecting a graphical or text-based image on a nearby wall or in the air in front of the agent (e.g., projecting an image in space at the agent's eye level).

Once a picking agent has reached the correct inventory area, a display device may project visual guidance for identifying and/or locating the particular item to be picked. For example, the display device may project a light beam or a laser beam pointing at the item, an image of the item, a text-based description of the item (e.g., "short red box", the title of a book, or a product name printed on the item or on a label attached to the item), text-based position information (e.g., "bottom shelf, 3rd book from the right"), a symbol or icon representing an item's position, or any other information suitable for identifying and locating the item to be picked. In some embodiments, the control system may store position and dimension information for all or a portion of the items stowed in the inventory area, and a display device may be programmed to point to a particular item by the control system, which may determine its position based on the width and the relative positions of the items in the inventory area. For example, if an item to be picked is known (or expected) to be the 3rd item from the left on a particular shelf and to be 3 inches wide, and the first two items are known to be 2 inches wide and 1 inch wide, respectively, the display device may be programmed to project a light beam or a laser beam at a position between 3 and 6 inches from the left edge of the shelf, where the item to be picked is (or should be) located.

As described above, a materials handling facility may include one or more receiving stations 180 for receiving shipments of inventory items from various vendors or other sources. The received stock may then be placed into stock storage in one or more inventory areas 235 of inventory 230, in one embodiment during a stowing operation (illustrated as stowing 190 in FIG. 1). As noted above, the control system may in some embodiments be configured to determine the location and/or position of a stowing agent 240 and may generate stowing instructions for the agent that are dependent on the agent's current location within inventory 230. For example, the control system may transmit messages including instructions for the agent to a display device that is near the agent, and this display device may project visual guidance suitable for directing the agent from their current location to the location in inventory in which an item is to be stowed. Such a projection may be emitted directly to a projection location visible to the agent from the display device or may be reflected off of one or more mirrors included in the system. In alternate embodiments, the projection of visual guidance may be directed to any reflective or refractive elements for presentation to the agent. Once a picking agent has reached the correct inventory area, a display device may project additional visual guidance for locating the position in the inventory area in which the item is to be stowed. For example, the display device may project a light beam or a laser beam pointing to the position at which the item should be stowed, an image of a bin in which it should be placed, text-based position information (e.g., "bottom shelf, $3^{rd}$ book from the right"), an icon or symbol representing the position at which the item should be stowed, or any other information suitable for locating the position at which the item should be stowed.

During stowing 190, the control system may determine the locations and/or positions for stowing items in inventory areas 235 randomly, pseudo-randomly, or according to one or more positional placement guidelines, in different embodiments. When an item is stowed, an indicator of its position may be stored in a product database and associated with a product identification code or other item or product information, in some embodiments. According to certain embodiments, the position information may then be available to control system devices, communication devices, or other computer devices, as described below. For example, a control system may access the position information and may use it to generate messages that include instructions for a picking agent that are transmitted to a display device and presented to the picking agent when the item is included in a customer order. Similarly, dimension information may be captured or estimated, and/or pattern-based information may be assigned or captured, for items received and stowed in inventory 230 and this information may be stored in a product database and associated with a product identification code or other item or product information. This descriptive information may be accessed by the control system, transmitted to a display device, and presented to a picking agent instead of, or in addition to, any position information associated with the item, in different embodiments.

A materials handling facility may in various embodiments include different arrangements of fixed-location and/or movable display devices. For example, in some embodiments, an array of such devices may be mounted on the ceiling of the facility, and/or a series of such devices may be mounted on walls, floors, poles, or shelving units within the facility. These display devices may be networked together (e.g., wirelessly or by wire) and/or configured to communicate with a control system, such as to receive messages from the control system that include instructions executable to initiate displaying location information, position information, descriptive information, and/or path information to agents within the facility. The display devices may also be configured to receive messages from a control system or from an agent (e.g., via a handheld remote control device) including instructions executable to alter their position (e.g., their orientation and/or angle). For example, a display device may be directed to rotate, sweep, point in a particular direction, or "paint" a path to direct the movements of an agent within the facility based on instructions received from a control system or agent.

Figure 3:
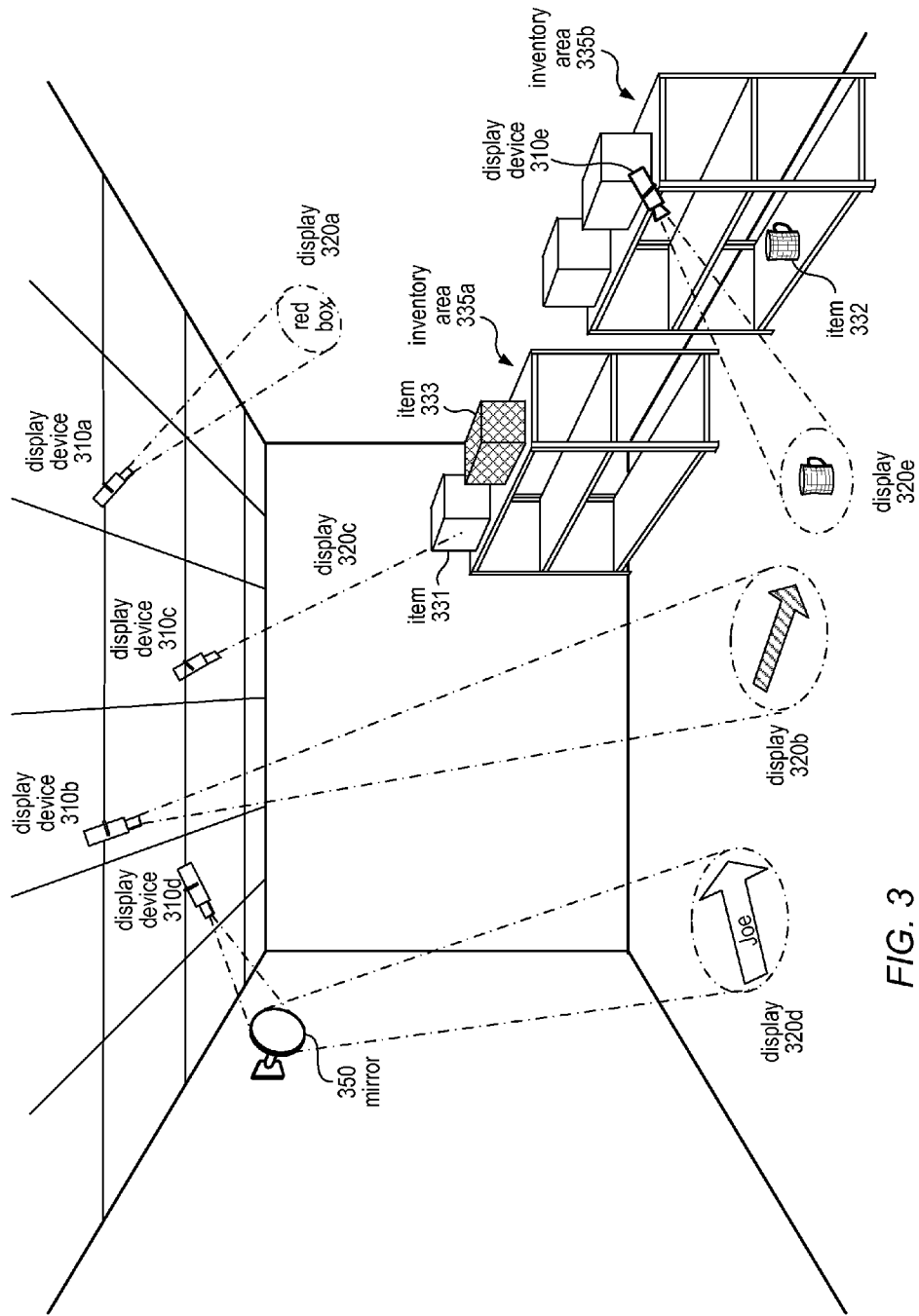
FIG. 3 illustrates a portion of a materials handling facility employing light-based display devices, according to one embodiment.

FIG. 3 illustrates a portion of a materials handling facility that includes both ceiling-mounted and shelf-mounted display devices, according to one embodiment. In this example, display devices 310a-310d are mounted in different locations on the ceiling, while display device 310e is mounted on the top of a shelving unit (inventory area 335b). In this example, each of the display devices 310 projects a different type of visual guidance, although in other embodiments, multiple display devices may project the same or different types of visual guidance, and/or each display device may be capable of projecting different types of visual guidance at different times. As illustrated in FIG. 3, display device 310a presents a text-based description of item 333 in inventory area 335a by projecting the words "red box" (display 320a) on the wall above inventory area 335a. In this example, display device 310b presents graphical information to direct an agent to inventory area 335b in the form of a colored arrow (display 320b) projected on the floor. Display device 310c presents information for locating item 331 within inventory area 335a by projecting a light beam or a laser beam (display 320c) pointing at item 331 in inventory area 335a. Display device 310d presents a combination of graphical information and text, useable to direct an agent to inventory 335a, in the form of an arrow labeled with an identifier of an agent, "Joe". Note that in this example, an image is emitted by display device 310*d*, directed to mirror 350. Mirror 350 is positioned to reflect the projected image on the floor as display 320*d*. Finally, display device 310*e* presents information for identifying item 332 within inventory area 335*b* by projecting a graphical image of the item (display 320*e*) on the floor in front of inventory area 335*b*.

As illustrated in FIG. 3, one or more moveable or otherwise adaptable mirrors may be included in a materials handling facility and may be positioned or otherwise adjusted by the control system to reflect visual guidance emitted or projected from a display device that is directed to the mirror(s). In some embodiments, one or more mirrors may be positioned to allow the projected visual guidance, when reflected by the mirror(s), to be presented to an agent in a location otherwise unreachable by visual guidance projected directly from the display device. For example, the control system may send instructions to two or more mirrors mounted at various locations within a materials handling facility to position them so that visual guidance projected from the display device on one side of the facility is "bounced" off of the mirrors to direct the visual guidance to a wall on the other side of the facility, or to a location for which there is no direct line of sight between the location and the display device. In other embodiments, the movement of the mirrors themselves may contribute to the projection of visual guidance. In such embodiments, the control system may send instructions to the system to manipulate the mirrors. These instructions may cause the mirrors to assume a sequence of positions, while projected visual guidance is directed to the mirrors, such that the desired image is created by the reflection of the projected visual guidance. In still other embodiments, a display system comprising liquid crystals, rather than mirrors, may reflect visual guidance projected by a display device. In such embodiments, the control system may send instructions to the liquid crystal display system, while the projected visual guidance is directed to the display system, to control the amount of light reflected by the liquid crystals such that the desired image is created by the reflection.

In embodiments in which fixed-location display devices are used, the devices may be placed such that a display may be presented in every applicable location within the facility. For example, in one embodiment a grid of devices on the ceiling may allow a display to be presented on the floor of every aisle, on every wall, and/or in front of every inventory area within the facility. In another example, the devices may be placed on the ceiling and/or in other locations within the facility such that a light beam or a laser beam may reach every inventory area and/or every item within inventory. The location and/or position of these fixed display devices may in some embodiments be calibrated with respect to the inventory areas in which they may project visual guidance. For example, in one embodiment each display device may be configured to project visual guidance in a section of a given aisle 25 feet long, and may be calibrated with respect to the inventory areas on that aisle such that the projected visual guidance may be presented directly in front of an inventory area to which an agent is directed or may point directly to specific items in the inventory area. In some embodiments, calibration of fixed-location display devices may be performed when the display system is installed within a materials handling facility and a re-calibration operation may be performed if and when the arrangement of inventory areas within the facility changes.

Calibration of display devices may in some embodiments involve placing markers in an inventory area (e.g., on a shelving unit) identifying the location of the inventory area itself, and/or a particular position within the inventory area. In such embodiments, the nearest display device may be directed to sweep a light beam or a laser beam across the area and the reflection of the beam from each marker (e.g., from reflective stickers or bar codes on each marker) may be detected by a fixed-location camera. The orientation and/or display angle of the display device at the time the reflection is detected may be stored and used by a control system when directing an agent to the inventory area and/or to a particular position within the inventory area. For example, markers may be placed on the far right and far left edges of each shelf in an inventory area, and the orientation and/or display angle of the nearest display device when pointing at each of the markers may be stored along with an identifier of the marker, and location/position information for the marker (e.g., an identifier of the inventory area or of an individual shelf, bin, etc.). The control system may then calculate what the orientation and/or display angle of the display device should be in order to project a light beam or a laser beam at a particular item on one of the shelves by extrapolating the position of the item with respect to the stored marker information and stored location/position information for the item (e.g., an identifier of the inventory area in which it is stored and an indication of its position within the inventory area). In another embodiment, a scanner may be used to capture marker information as a light beam or a laser beam is swept across an inventory area during a calibration operation. In general, any combination of display devices, cameras, and/or scanners may be used in automatically calibrating the display devices to the inventory areas and/or their contents.

In alternate embodiments, another type of calibration operation may be performed. For example, in one embodiment, an agent may manipulate the orientation and/or display angle of a display device until it is pointed to a particular inventory area, mirror, marker, or item, and then may cause the orientation and/or display angle to be captured and stored along with an identifier of the display device, inventory area, mirror, marker, and/or item (e.g., by pressing a button on a remote control device for the display device and scanning or entering one or more identifiers to be associated with the current location, orientation, and/or display angle of the display device).

In some embodiments, using one of the calibration techniques describe above, or another calibration technique, the location and position of each display device with respect to the inventory areas, mirrors, shelves, bins, pallets, and/or items may be determined and stored along with identifying information. This information may be accessed by a control system and used to direct an agent to a particular inventory area and/or position within an inventory area to stow or pick items using a display system, as described herein, or a combination of a display system and other communication devices and methods.

As described above, many facilities store items having the same UPC, SKU code, ISBN or other identifier in different individual inventory areas within stock storage. Storing these items in multiple inventory areas may shorten the distance, and therefore the time, required to obtain an item from inventory, in some embodiments. Additionally, different items may be stored in a single inventory area, according to certain embodiments. Storing different items together may result in more efficient use of total inventory space than using a single inventory area for a single item or product. It still may be beneficial in some embodiments to store similar items together to make better use of inventory space. For example, storing different books together on a single inventory shelf may use the available inventory space more efficiently than storing one book among other items of greatly differing size and shape, such as electronic devices, clothing, toys, hardware, materials, or other items. Thus, in some embodiments, a materials handling facility may store items of similar shape and size together in a single inventory area. For instance, in such an embodiment, items such as books, CDs, and DVDs may all be stored together. In some embodiments, multiple items sharing a common UPC, SKU code, ISBN, or other identifier may be stored together with multiple items sharing a different UPC, SKU code, ISBN, or other identifier. For example, a single inventory area may store multiple copies of each of several different books, CDs, or other items.

In certain embodiments, items may be randomly stored together in inventory areas. Such random storage may increase storage efficiency and may in some cases increase the likelihood that any individual item may be easily distinguished from the other items with which it is stored. Random storage of items may also decrease the amount of time needed to store individual items into inventory. A control system for the facility may track where each item is stowed. As previously noted, in some embodiments, determining where to stow an item may be performed manually, while in other embodiments, it may be an automated process performed by one or more computer software programs based on pattern information associated with the individual items, and/or based upon positional placement guidelines, as described below.

When obtaining a particular item from an inventory area storing different items, picking agents may have to carefully examine each item in the inventory area to properly identify the specific item to be picked. For example, if a picking agent is instructed to obtain a single copy of a book, CD, or DVD that is stored among other different books, CDs, or DVDs, the agent may have to read the title of each item in turn to identify the specific one to pick. For example, it may take a picking agent additional time to distinguish from among multiple, different CDs all of whose titles include "Greatest Hits."

In some embodiments, a light-based display device may be used to project visual guidance that includes position information corresponding to the relative position of the item to be picked, and/or descriptive information associated with the item, so that the agent may not have to carefully read the title of each CD in the inventory area until the correct one is encountered, thus decreasing time required to pick the item. In some embodiments, the presented information may indicate the position of an item with reference to the inventory area itself, such as "$2^{nd}$ book from the right," "$3^{rd}$ CD from the front," or "$4^{th}$ shirt from the top." In other embodiments, the presented position information may indicate the item's position with reference to other items in the inventory area, such as "$3^{rd}$ book to the right of *War and Peace*," "$2^{nd}$ shirt below green jeans," or a graphic or visual image indicating the book's relative position within the area, as viewed by the picking agent.

Note that in order to take advantage of position-based item identification, a materials handling facility may in some embodiments operate using one or more sets of positional placement guidelines governing how items are stored in inventory areas. In various embodiments, different types of items may be stored according to different guidelines. For example, books may be stored (e.g., on shelves) according to a guideline specifying that books should always be added to the right of any other books or other items already in the inventory area. In other examples, clothes on hangers may always be added to the right of other clothes, clothes stored on shelves may always be added to the top of a stack of clothes, or CDs and DVDs may always be added to the front of a group of similar items lined up front to back on a shelf or in a bin. In other embodiments, different guidelines may be applied to different inventory areas or to different types of inventory areas. For example, items stored on narrow shelves may always be added on the right, while items stored on deep shelves or in bins may always be added to the front. In another example, if items of different sizes and shapes are stored together in an inventory area, a placement guideline may specify that items should be placed in order of size, such as with the largest item adjacent to one side of the inventory area and successively smaller items placed next to each other toward the middle or the other side. In other embodiments, more complex guidelines for stowing items may take into account a combination of size, shape, pattern information, or other criteria in determining a position in which to place an item in an inventory area. In other embodiments, when items are added to inventory areas storing many different items that are easily distinguished from each other, the items may be added without regard to any positional placement guidelines, and the position at which an item is stowed may need to be input to the control system by the stowing agent in order to be able to retrieve it using position-based item identification.

In some embodiments, a light-based display system may be used to present position information along with other descriptive information (such as a title or product name), dimension information (such as a height, relative height, width, relative width, length, relative length, or shape), or pattern information representing an intrinsic or assigned pattern that may be used to visually distinguish an item from others in the inventory area. In other embodiments, descriptive information may be presented without any position information. For example, pattern information may be presented that includes a color and/or shape pattern based on a view of the item, (or of a title or logo of the item), a color and/or shape pattern representing a color of a package or wrapper enclosing the item or of an indicator applied to the item or its packaging, or a scanned or photographic image of the item, according to various embodiments.

In some embodiments, a light-based display device may project visual guidance that includes a textual and/or graphical representation of pattern information, either alone or in combination with other presented pattern or position information. For example, a DVD may be enclosed in a blue clamshell-style case and/or have a sticker printed with a star shape attached to the case. In another example, a software CD case may have a tag attached that is printed with a blue star. In some embodiments, presented pattern information displayed by the display device for these items may include graphics representing "blue" and "star," or a single graphic representation of a blue star. In another example, position information, such as "left half," and pattern information, such as representing a blue star, may both be presented to a picking agent. In other embodiments, the words "blue star" may be presented as pattern information and text indicating "second from left" may be presented as position information. In some embodiments, the projected visual guidance may include a scanned or photographic image of a view of an item. In still other embodiments, a display device may project visual guidance that includes a light beam or a laser beam pointing to a given item based on stored position information, instead of, or in addition to, other projected information. In general, both image and non-image information may be included in the projected visual guidance representing location, position, and/or descriptive information, and/or instructions for directing the agent to a particular location/position with stock storage using a light-based display system, according to different embodiments.

As noted above, a materials handling facility configured to fulfill orders may include a plurality of receiving stations configured to receive items for storage, a plurality of inventory areas configured to store the received items, and a plurality of packing stations configured to package items selected from the inventory areas. An agent may traverse the materials handling facility, directed to the appropriate inventory areas by a light-based display system, and may select each item from one or more of the inventory areas. The agent may use additional information presented by a light-based display device to locate each item within an inventory area and transfer it to one of the packing stations. In other embodiments, a picking agent may use another communication device to identify an item at a single shelf inventory area, instead of, or in addition to the light-based display. For example, in one embodiment, a light-based display system may direct the agent to the inventory area in which an item to be picked is stored and then additional information (e.g., descriptive information and/or position information) may be presented to the agent on a handheld communication device. In some embodiments, a handheld communication device may be used to scan an identifier of a picked item to determine if it is the correct item, or to confirm that it is the correct item. Similarly, during a stowing operation, an agent may be directed to a particular inventory area using a light-based display system, and then the agent may use a handheld communication device to scan an identifier of the inventory area and/or to enter information indicating the position within the inventory area at which the item was actually stowed. For example, a handheld communication device may include a scan device for reading bar-type scan codes, such as SKU or ISBN on an item or may be configured to communicate with a separate scan device to receive such codes and communicate them to the control system.

Figure 4:
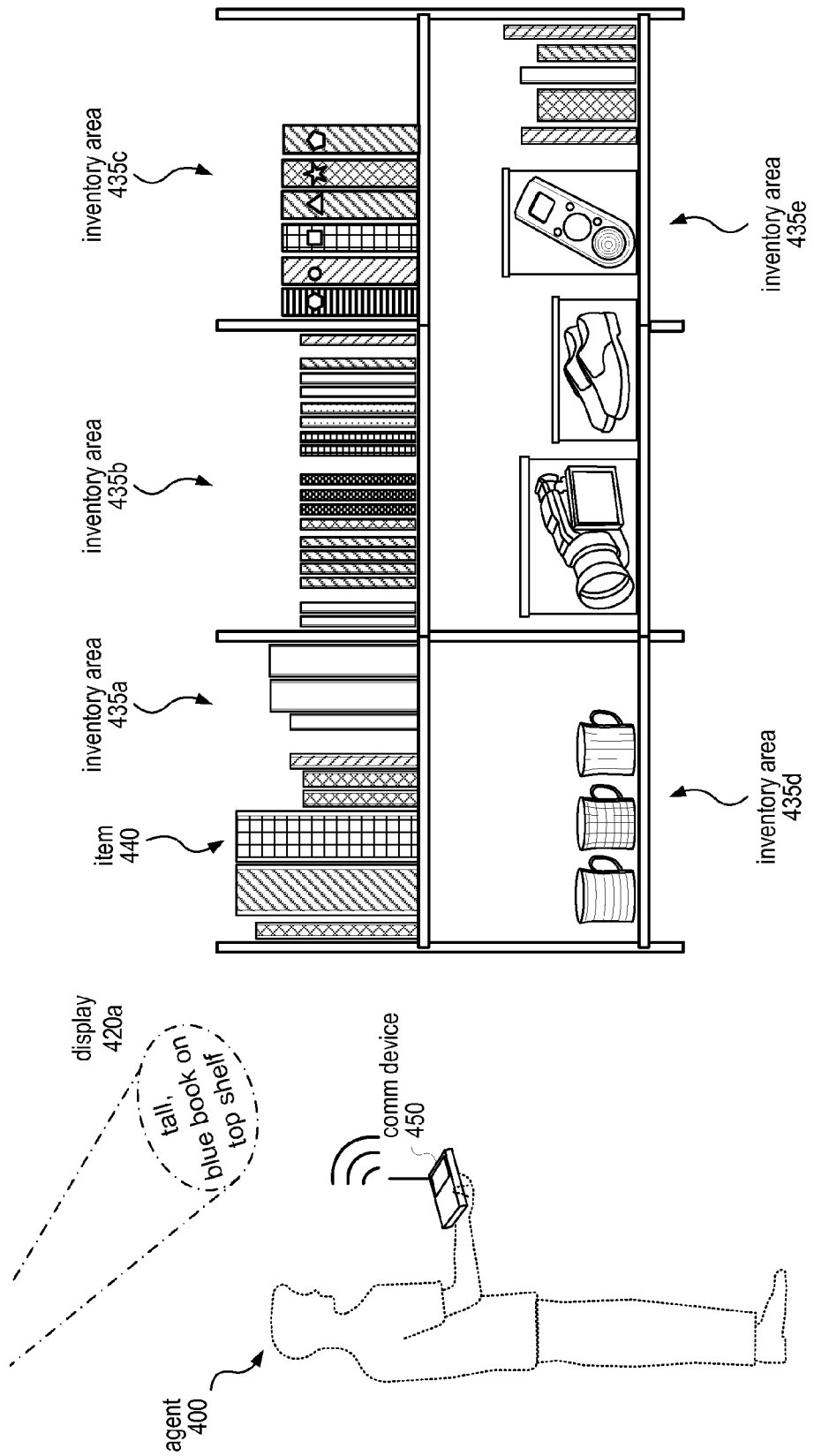
FIG. 4 illustrates a picking agent using a light-based display to identify an item at an inventory area, according to one embodiment.

FIG. 4 illustrates an agent using both a light-based display system and a handheld communication device in a picking operation, according to one embodiment. In this example, an agent 400 has been directed to a multi-shelf section of a materials handling facility to pick an item 440 from inventory area 435a. As described above, agent 400 may have been directed to the area by the light-based display system or by other means. As illustrated in FIG. 4, agent 400 carries a communication device 450, which in some embodiments may communicate the agent's location to a control system in the materials handling facility (not shown). In other embodiments, communication device 450, rather than a light-based display system, may have been used to direct the agent to the multi-shelf area. In still other embodiments, communication device 450 may present all or a portion of a pick list to agent 400 that includes item 440 in inventory 435a. Such a pick list may indicate that item 440 is a book, and may include the title of the book, for example. In various embodiments, communication device 450 and/or a light-based display system may receive information from a control system controlling the filling of orders to present to agent 400, as will be described below regarding FIGS. 9A and 9B.

In this example, because the agent has reached the appropriate multi-shelf area, the control system may communicate instructions to a light-based display system to project visual guidance to agent 400 with information for locating and identifying item 440. In this example, a ceiling-mounted display device (not shown) projects text on the wall in front of agent 400 that includes both descriptive information and position information. As illustrated in FIG. 4, display 420a includes the following text, "tall, blue book on top shelf" In this example, item 440 may be the only blue book on a nearby top shelf (e.g., in inventory areas 435a-435c), or may be the tallest blue book in these inventory areas. In either case, this may be enough information for agent 400 to locate item 440. If item 440 is not the only "tall, blue book" on a nearby top shelf, agent 400 may need to read the titles of several books to be able to identify the correct book to pick, or agent 400 may be able to request additional information (e.g., additional position information or descriptive information) using communication device 450. This additional information may be presented on communication device 450, or may be projected using the light-based display system, in different embodiments.

In some embodiments, once agent 400 has picked item 440 from inventory area 435a, the agent may scan an identifier of item 440 (e.g., using communication device 450) to verify that it is the correct item and/or to record the fact that it has been picked. The captured identifier may be communicated to the control system by communication device 450 and stored for later processing. Note that in some embodiments, agent 400 may be presented with all the information needed for a given operation (e.g., directions to the multi-shelf area, picking instructions and/or a pick list, stowing instructions, position information and/or descriptive information about an item, etc.) using a light-based display system, as described here, and may not utilize an additional communication device in picking and/or stowing operations.

Note that while FIG. 4 illustrates the use of both a light-based display system and a handheld communication device in a picking operation, a light-based display system and handheld communication device may be used together in a similar manner in a stowing operation. In one such embodiment, a stowing agent may be directed to an inventory area at which an item is to be stowed, such as the multi-shelf area illustrated in FIG. 4, using one of a light-based display system or a handheld communication device. The agent may receive additional information (e.g., stowing instructions, or positional information regarding where an item should be placed) from the other. For example, when the agent reaches the appropriate inventory area, a light-based display device may project visual guidance in the form of text-based instructions (e.g., "place book to right of War and Peace" or "place box on far left side of second shelf"), or may project visual guidance in the form of a graphical image or virtual view of the position in the inventory area at which the item should be placed (e.g., an image depicting the inventory area and identifying where in that area the item should be placed). In one embodiment, the agent may use a handheld communication device, such as communication device 450 of FIG. 4, to scan an identifier of the item once placed, and/or to enter information indicating the inventory area and/or the position of the item within the inventory area. This information may then be communicated to the control system and stored (e.g., along with an identifier of the item) for later use.

While several examples described herein involve the identification of items such as books, CDs, and DVDs, position information and/or descriptive information may be utilized with generally any kind of item, including, but not limited to electronic devices, clothing, toys, hardware, materials, and/or other items according to various embodiments. For example, position information and/or additional descriptive information (e.g., other than a title) may aid in identifying a book from among several books, as illustrated in inventory area 435a, or in identifying a CD from among other CDs in inventory area 435b, or a DVD from inventory area 435c. Additionally, position information and/or descriptive information may be used with other items such as to identify a particular cup or mug, as in inventory area 435d (e.g., "green mug, $3^{rd}$ from right"). Position information and/or descriptive information may also be used to identify items from more dissimilar items such as those illustrated in inventory area 435e (e.g., "wide, red box on far left").

In some embodiments, position information and/or additional descriptive information may be presented optionally and may not be presented for an item that is already easily distinguishable from other items. For example, an agent instructed to pick a video camera from inventory area 435e may not utilize any position or additional descriptive information since an item description on a pick list (e.g., "video camera") may be enough to locate the correct item, in one embodiment. However, position information and/or additional descriptive information may be presented for another item in the same inventory area, according to one embodiment. For instance, position or additional descriptive information may be presented to locate one of the books that are also in inventory area 435e or to locate one of several video cameras (e.g., "video camera on left," or "solid black video camera") in a different inventory area containing more than one video camera. In some embodiments, position and/or additional descriptive information may be presented for certain items and not for others in the same inventory area, depending upon various similarities of an item to be picked to other items in the inventory area. Thus, in some embodiments, position and/or additional descriptive information may be presented only if necessary. Only presenting additional information when necessary may save network bandwidth or other compute resources, in certain embodiments.

Figure 5:
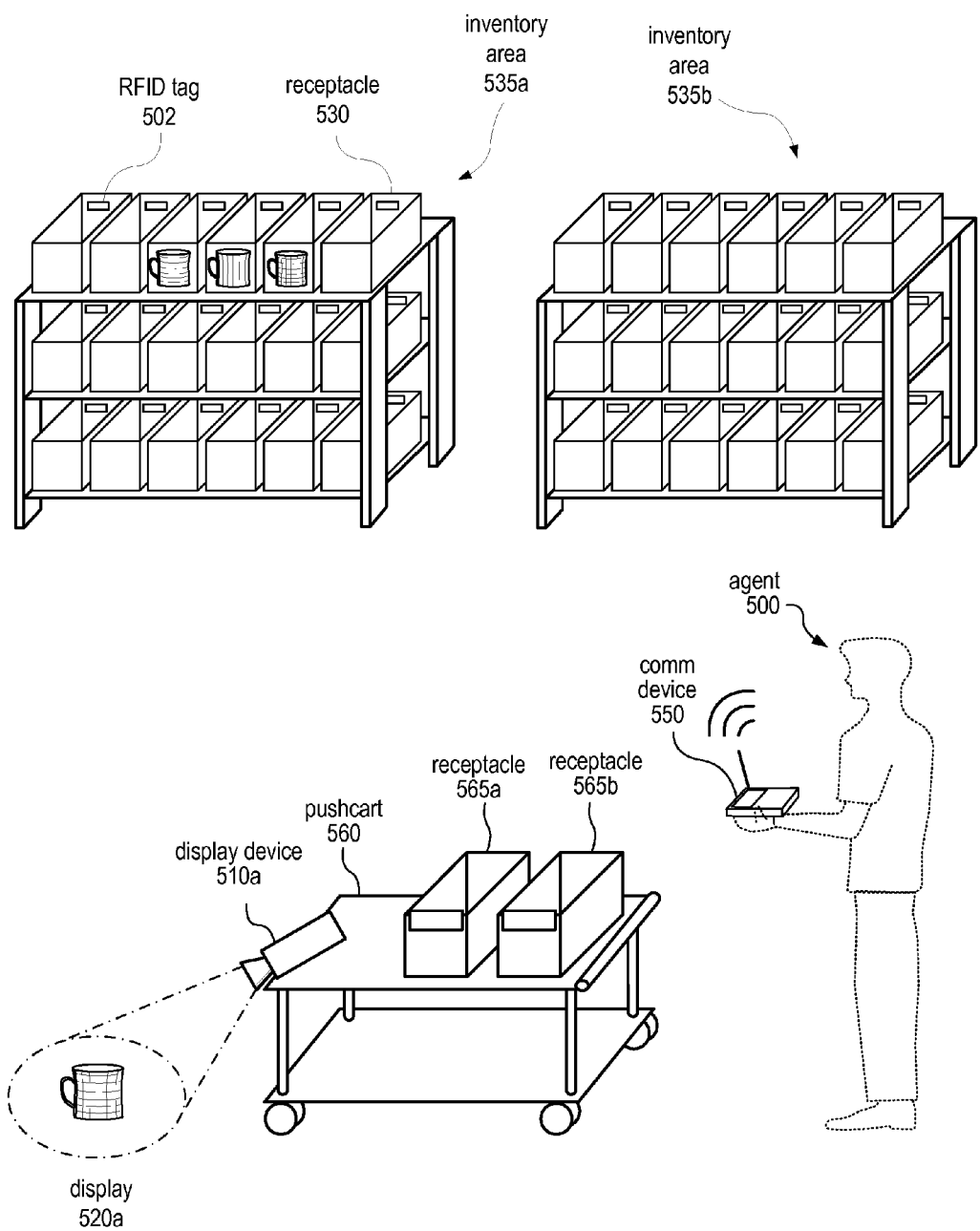
FIG. 5 illustrates a picking agent using a light-based display to identify an item at an inventory area, according to one embodiment.

FIG. 5 illustrates another example of an agent using both a light-based display system and a handheld communication device, according to one embodiment. In this example, an agent 500 has reached a section of an inventory area containing two shelving units 535. Agent 500 is carrying a communication device 550, which may in some embodiments be the same as, or similar to, other such handheld communication devices described herein, such as communication device 450 in FIG. 4. Agent 500 also has a pushcart 560 on which a portable light-based display device 510a and two receptacles 565 are situated. Communication device 550 may in this example determine the location of agent 500, e.g., by detecting one or more RFID tags 502 on receptacles 530 in inventory area 535a or 535b. In other embodiments, the location of agent 500 may be determined by scanning one or more markers in the area (not shown) using communication device 550, by sensing the location of a global positioning system (GPS) device located on the agent or the pushcart, by triangulation of radio signals, or by other means. This information may be communicated to a control system, which may in turn communicate with display device 510a (e.g., wirelessly) to cause it to project visual guidance for agent 500.

In the example illustrated in FIG. 5, display device 510a projects visual guidance in the form of an image (display 520a) of a particular mug that agent 500 is to pick from inventory on the floor in front of pushcart 560. In this example, agent 500 may be able to easily locate the receptacle 530 containing the correct mug by identifying the receptacle 530 having a matching image printed thereon. In some embodiments, if agent 500 is not able to locate the correct mug based on the presented image, the agent may request and receive additional visual guidance, such as position and/or descriptive information, to help the agent find the item (e.g., "top shelf," "left unit," or "oversized mug"). This additional information may be presented by display device 510a or on communication device 550, in different embodiments. As in the previous example, once the mug has been located and picked, agent 500 may scan an identifier of the item, which may be communicated to the control system and stored for later use. In some embodiments, agent 500 may pick items for more than one order, and may place picked items for different orders in a particular one of receptacles 565 on pushcart 560. In some embodiments, display device 510a may display information indicating the particular receptacle 565 in which an item is to be placed (e.g., "first tote," or "red tote"), or similar information may be presented to agent 500 using communication device 550. In still other embodiments, a display device (e.g., display device 510a, or another light-based display device mounted on a wall, shelving unit, ceiling, etc.) may project a light beam or a laser beam at the appropriate receptacle 565.

Note that in the example illustrated in FIG. 5, a portable light-based display device mounted to a pushcart 560 is used to present instructions to agent 500. Such a mobile display device, mounted at a known height, may in some embodiments be usable for projecting information in a corner of the floor, on a wall behind a shelving unit, at the end of an aisle, or in another location that may be difficult to reach using a series of fixed-location (e.g., ceiling-mounted, shelf-mounted, or wall-mounted) display devices. In another example, a mobile display device may be capable of projecting a light beam or a laser beam or projecting other information at a position on a low or deep shelf, or at a position on the floor far ahead of pushcart 560 (e.g., using a low angle). In some embodiments, a mobile display device may be configured to direct a light beam, a laser beam, or another display to one or more mirrors (not shown). These mirrors may in some embodiments be mounted at fixed locations within the facility and may be positioned and/or adapted to reflect the light beam, laser beam, or other display according to instructions sent to them by a control system, as described above.

In some embodiments, a mobile display device (e.g., one that travels along with an agent as the agent traverses the facility during picking and/or stowing operations) may also project visual guidance in the form of text, graphics, and/or images to the agent to direct the agent to a particular location within the facility. For example, rather than a series of ceiling-mounted display devices painting a path for one or more agents, a portable display device may project text, graphics and/or images out in front of a particular agent to guide the agent through the facility. In such embodiments, a control system may need to be able to track the location of the agent and/or the pushcart as they traverse the facility in order to present instructions to the agent that are in the context of the agent's current location. In one embodiment, each time an agent (or the agent's pushcart) passes the end of an aisle, a shelving unit, or another fixed-location reference within the facility, an identifier of the agent or pushcart may be captured and the location of the agent or pushcart may be calibrated with respect to the references. For example, scanners or other detection devices may be placed at these fixed-location references to scan a marker or detect a signal from an RFID tag of an agent or pushcart as they pass the references. In this example, as the agent or pushcart enters a given area of the facility, the signal from the RFID tag may be detected and transmitted to the control system to indicate the agent's location. In other embodiments, the control system may be configured to attempt to determine a current position for an agent periodically, such as once every five seconds, or in response to an agent not reaching a specific area or reference (e.g., along the agent's path) within the time predicted for the agent to have reached the area or reference. In another embodiment, an agent may scan a marker of a fixed-location reference or detect a signal from an RFID tag at a fixed location using a handheld communication device. In yet another embodiment, a communication device mounted on the pushcart or a handheld communication device carried by the agent may include GPS-type functionality and/or may transmit a signal detectable by the control system and usable to determine the location of the pushcart and/or agent. In some embodiments, a handheld communication device and/or a pushcart may be configured to determine its own location by other means (e.g., by automatically scanning references along the agent's path, or by counting the turns of the pushcart's wheels) and to communicate this information to the control system. In some embodiments, a mobile or handheld device may be configured to project an identifier of an agent (e.g., a name, an employee number, or another symbol or image representing the agent) on the ceiling above the agent or on a wall near the agent (e.g., in response to the agent initiating such a projection by pressing a button on the mobile or handheld device). In such embodiments, one or more cameras or other sensors in the facility may be configured to detect the identifier and to determine the position of the agent dependent on the identifier and on the location on the ceiling or wall at which the identifier was projected.

In general, various combinations of fixed-location devices (e.g., light-based devices, scanners and/or cameras mounted at fixed locations within a facility) and mobile devices (e.g., light-based devices, scanners, and/or cameras carried or mounted on movable components within the facility) may be used in conjunction with various markers, RFID tags, or other identifiers of agents, items, pushcarts, and/or inventory areas to determine and track the location, position and/or orientation of agents and pushcarts (or other containers used to transport items) within the facility. For example, in one embodiment, one or more light-based display devices mounted on a surface (e.g., a ceiling, floor, shelf, or wall) may direct an agent to a particular inventory area, and then a mobile display device may project additional information for locating a particular storage position or item within the inventory area. In another example, a mobile display device (e.g., mounted on an agent's pushcart) may direct an agent to an inventory area and then a fixed-location display device targeted to that area may be used to identify a particular position or item within the area. In another example, ceiling-mounted display devices may be used to identify individual inventory positions or individual items on high shelves, or to illuminate whole inventory areas (e.g., pallets), while fixed-location display devices mounted in lower positions (e.g., those mounted on the wall, floor, or a low shelf) or mobile display devices may be used to identify individual inventory positions or individual items on low shelves or in tight corners. In any of these embodiments, fixed-location cameras or scanners may be used to determine and/or track the location of the agent and/or the agent's pushcart as they traverse the facility. For example, in one embodiment a camera or scanner at a fixed location may be configured to use face or pattern recognition to determine an agent's location (e.g., by scanning a marker or other identifier on a hat, badge, shoulder strap, pushcart, etc.). In another embodiment, an agent's current location may be determined by triangulating information received from two or more scanners or sensors of fixed position (or currently known location) in the materials handling facility. For example, information received from two scanners or sensors that detect the presence of the agent may include the distance from each of the scanners or sensors to the agent and the angle of the scanner or sensor when the agent is detected.

In one embodiment, each time an agent stops at a particular inventory area to pick or stow an item, an identifier associated with the inventory area may be captured by a mobile display device, scanner, or camera (e.g., by scanning a marker or detecting a signal from an RFID tag). If two or more identifiers are scanned or detected, the control system may in some embodiments be capable of determining both the location and position/orientation of the agent (or the agent's pushcart). Using this information, the control system may be able to direct a mobile display system (e.g., one mounted on the agent's pushcart) to project a light beam or a laser beam at a particular position within an inventory area or at a particular item within the inventory area. In such embodiments, the control system may access position and/or dimension information associated with an item to be picked in order to determine where to project the light or laser beam from a mobile display device so that it will point to the item to be picked. Similarly, the control system may access dimension information, positional placement guidelines, and/or information about items already stored in a given inventory area to determine where to project a light beam or a laser beam from a mobile display device to identify a position in the inventory area in which an item should be stowed. In other embodiments, the control system may access such position, dimension, and/or placement information in order to determine where a light beam or a laser beam from a fixed-location display device should be projected to identify a given item or a position in which an item should be stowed.

Figure 6A:
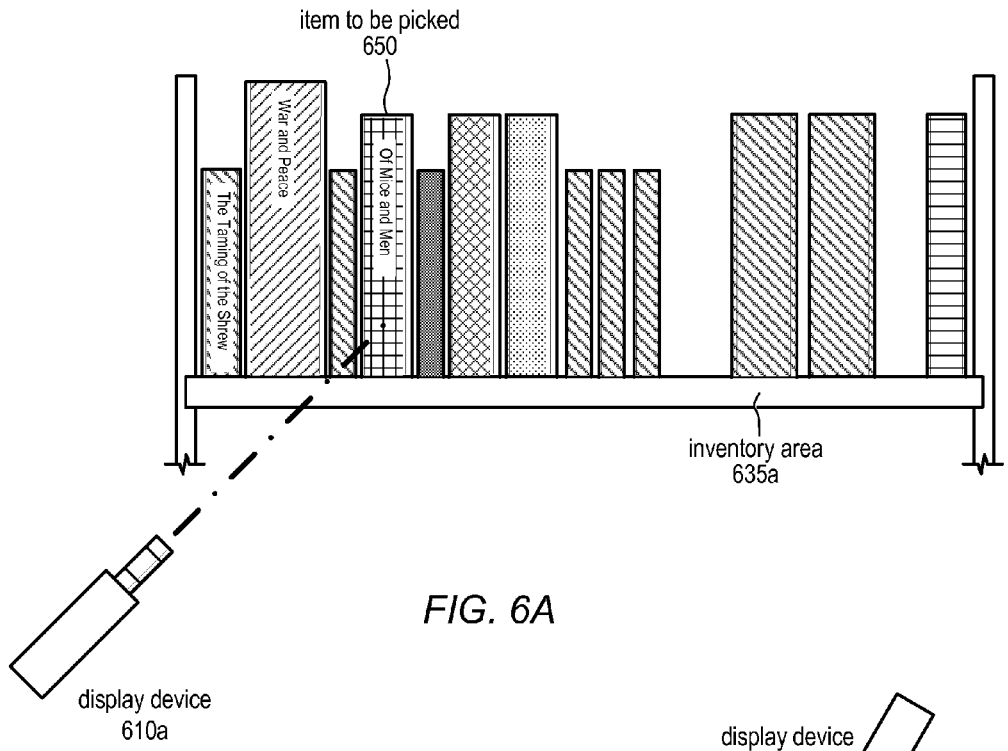
FIG. 6A illustrates a display device projecting visual guidance for identifying an item in inventory, according to one embodiment.
Figure 6B:
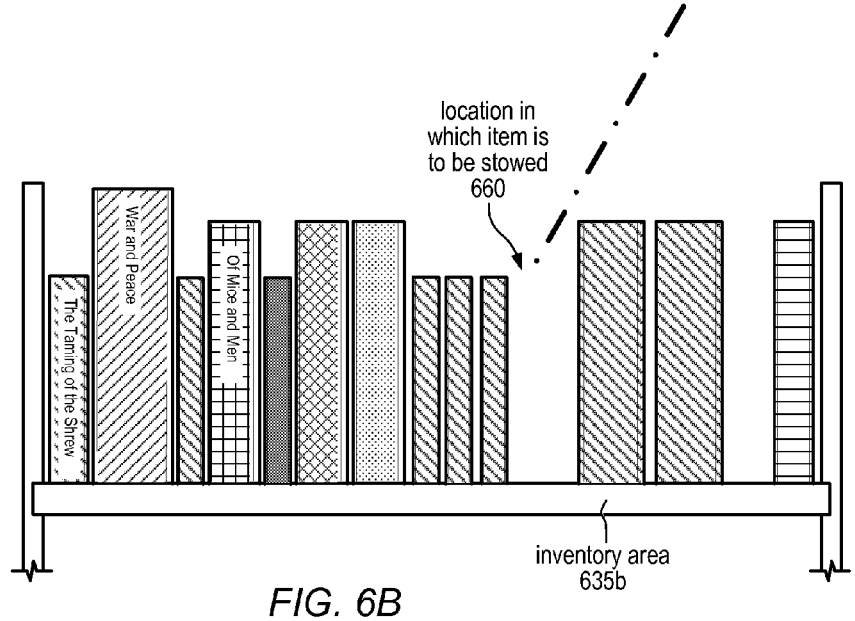
FIG. 6B illustrates a display device projecting visual guidance for identifying a location at which an item is to be stowed in inventory, according to one embodiment.

FIGS. 6A and 6B illustrate the use of a light-based display device in picking and stowing, respectively, according to one embodiment. FIG. 6A, for example, illustrates identification of item 650 (the book, *Of Mice and Men*) within inventory area 635*a*. In this example, a display device 610*a* is directed by a control system (not shown) to project a laser beam at item 650. As noted above, in some embodiments the control system may determine where the beam should be projected (e.g., the orientation of display device 610*a*, and the direction and angle of a laser beam projected by the device), dependent on the position of the display device and on stored position and dimension information for item 650 and the other items in inventory area 635*a*. In this example, display device 610*a* may be a fixed-location display device or may be a mobile device whose location and position/orientation have been determined through calibration, as described above. As previously noted, in some embodiments, the color of a light beam or a laser beam used to identify a particular item may be specific to a particular picking agent, a customer order, or another item grouping. For example, in one embodiment, a picking agent may be picking items for multiple orders or item groupings and may be placing items in different totes or receptacles depending on the order or group to which the items belong. In this example, the color of the beam used to identify an item may match the color of the tote or receptacle (or an identifier on the tote or receptacle) in which the item should be placed. In another example, two picking agents may be picking items in the same inventory area (or in nearby inventory areas), and each agent may be able to locate the item(s) they should pick based on the color of the beam used to identify them (e.g., using a different colored beam for each agent). In yet another example, multiple agents may be able to locate item(s) or directions in the same area at the same time by utilizing different wavelengths for the beams and providing agents with wavelength filtering goggles or glasses that only allow beams of a particular wavelength to pass through. In such an example, each agent may be associated with a different wavelength and provided with glasses or goggles such that they can only see light-based guidance displayed in the associated wavelength. By using different wavelengths for different agents, the same or multiple display devices may transmit guidance to multiple agents in the same area without causing interference or confusion between agents.

FIG. 6B illustrates identification of a position in inventory area 635b at which an item (e.g., another book) should be stowed, according to one embodiment. As illustrated in FIG. 6B, a laser beam displayed by display device 610b is directed to a location 660 in inventory 635b. In this example, a control system may have determined that the item should be stowed in location 660 based on positional placement guidelines, on guidelines based on the item being readily distinguishable from other items in inventory area 635b, on guidelines for random or pseudo-random placement of items in the facility, or by other means. The control system may then have determined the position where a laser beam should be pointed (e.g., the orientation of display device 610b, and the direction and angle of a laser beam displayed by the device), dependent on the position of the display device and on stored position and dimension information for the other items in inventory area 635a and on dimension information for the item to be stowed. As in the example illustrated by FIG. 6A, display device 610b may be a fixed-location display device or may be a mobile device whose location and position/orientation have been determined through calibration, as described above. Also as previously noted, in some embodiments, the color of a laser beam used to point to a particular position in an inventory may be specific to a particular picking agent, e.g., when two or more agents are stowing items in the same inventory area or in nearby inventory areas.

Figure 7:
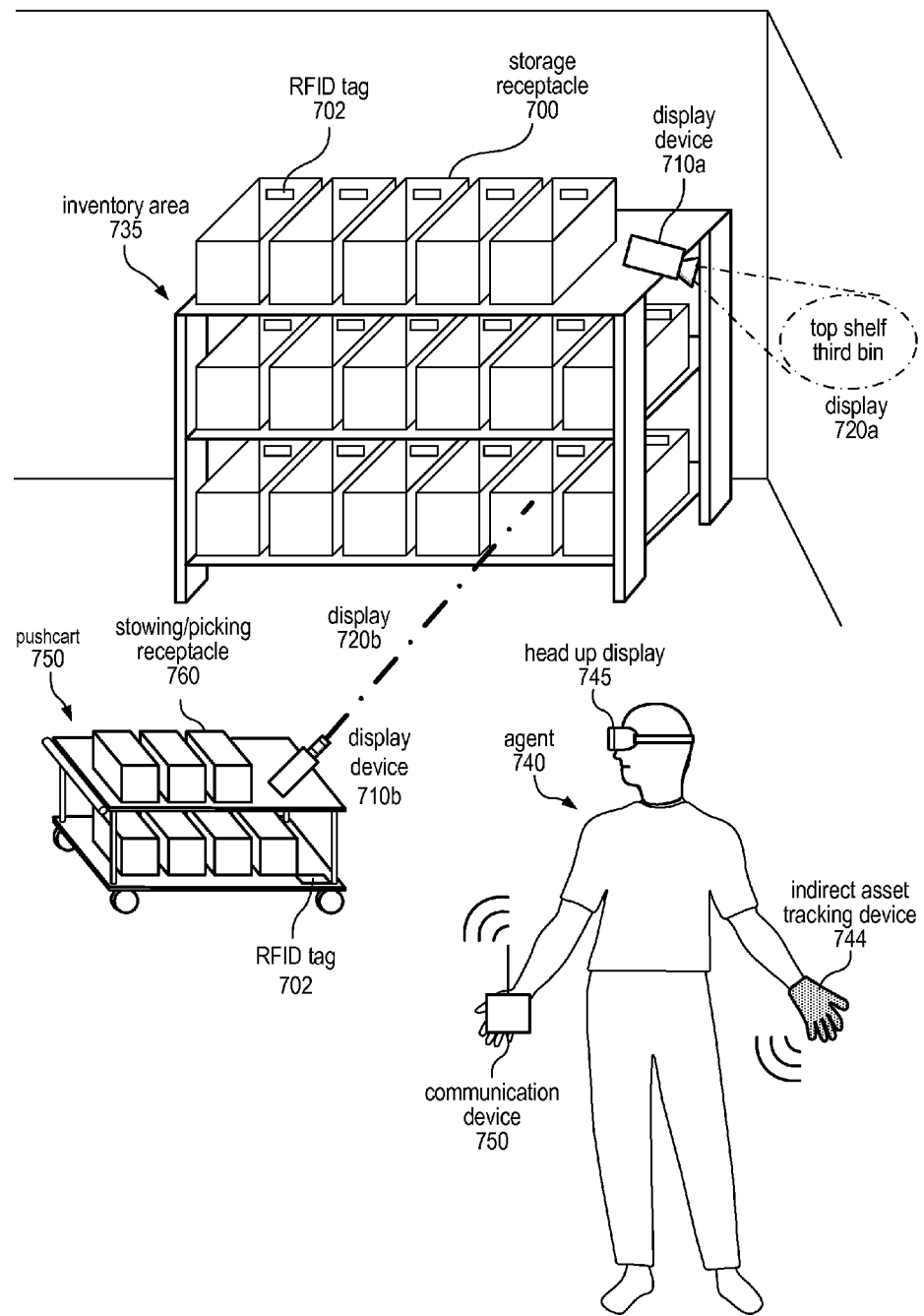
FIG. 7 illustrates various uses of light-based display devices and other communications devices in an inventory area, according to different embodiments.

A materials handling facility may employ more than one type of display device to facilitate picking or stowing operations, in different embodiments. FIG. 7 illustrates a portion of a materials handling facility that uses two types of display devices, along with several other communication devices. In this example, an agent 740 has reached a particular inventory area 735 that includes several rows of storage receptacles 700. Each of the storage receptacles 700 includes an RFID tag 702. A display device 710a is mounted at a fixed location at the top of the shelving unit and is positioned to project visual guidance on a nearby wall. In other embodiments, a display device mounted on a shelving unit may be positioned to display information on the floor in front of the shelving unit instead. In still other embodiments, the orientation and/or angle at which display device 710a operates may be manipulated by a control system, so that it may display information in two or more different locations according to instructions communicated to it by the control system. In this example, the information displayed (display 720a) includes text-based instructions for locating a particular one of storage receptacles 700 for a picking or stowing operation (e.g., "top shelf third bin"). In other embodiments, visual guidance projected by a display device mounted in an inventory area may include other types of information and/or may be projected in other formats, as described herein.

FIG. 7 also includes a display device 720b mounted on pushcart 760, brought to the area by agent 740. In this example, pushcart 760 includes an RFID tag 702. As in the example illustrated in FIG. 5, the position and/or orientation of display device 720b may be determined by calibrating its position with respect to two or more fixed references when agent 740 arrives in the area with pushcart 760. In this example, the projected visual guidance from display device 710b includes a light beam (display 720b) directed to a particular storage receptacle 700 on the bottom shelf of inventory 735. This projected visual guidance may in various embodiments indicate a bin from which an item should be picked or one in which an item should be stowed.

As illustrated in FIG. 7, an agent may use one or more communication devices in a picking or stowing operation, in addition to one or more display devices. In this example, agent 740 carries a communication device 750. This communication device may be similar to communication device 450 of FIG. 4, or communication device 550 of FIG. 5, in some embodiments. For example, communication device 750 may be configured to receive picking or stowing instructions from a control system; to direct agent 740 to inventory area 735; to facilitate calibration of the location of pushcart 760; to scan, enter, or record information about a picked or stowed item; or to request and/or present additional information to agent 740 to help the agent locate an item or a particular storage receptacle 700, in different embodiments. For example, in one embodiment, communication device 750 may include a camera. In this example, if the agent is unable to locate an item, the agent may take a picture of the inventory area and may communicate the captured image to the control system. The control system may apply optical character recognition to the image to identify one or more of the items in the image in order to locate the item or to verify that the item is not present in the inventory area. The control system may then send additional guidance to the agent or may instruct the agent to abandon the search for the item. In some embodiments, the agent may take one or more pictures of the inventory area and communicate them to the control system so that the control system can correct or otherwise update information stored for the inventory area.

FIG. 7 also illustrates an indirect asset tracking device 744, worn or carried by agent 740. In this example, receptacles, pushcarts, and/or inventory areas in the materials handling facility may be equipped with RFID tags 702. Each RFID tag 702 in the materials handling facility may include a unique identifier that uniquely identifies the RFID tag at least within the materials handling facility (or within a portion thereof). The location of each receptacle or other asset within a materials handling facility to which an RFID tag is attached, and/or other information relevant to the receptacle or other equipment to which the RFID tag is attached, may be associated with the unique identifier of the RFID tag and stored such that it is accessible by a control system in the facility. Agents within the materials handling facility may be equipped with RFID readers, which may be integrated in or attached to gloves, wristbands, or other devices (e.g., an indirect asset tracking device 744) worn or carried by agents. The location of each receptacle to which an RFID tag 702 is attached may be associated with a unique identifier of the RFID tag. In such embodiments, when an agent's hand approaches an inventory area equipped with an RFID tag or enters a receptacle equipped with an RFID tag, the RFID reader may detect the presence of the agent's RFID tag and may activate and receive signals from the RFID tags within its range. This information, in combination with known information such as the location of the receptacles 700, may be used, for example, in verifying that a correct item is picked, or in determining a current location of the agent within the facility (e.g., by calibrating the location of the agent to known reference points within the facility).

In another embodiment, an indirect assert tracking device 744 may be mounted on an agent's pushcart 750, rather than being worn or carried by agent 740, and this tracking device may be used to determine an agent's current location and/or to calibrate the location of a mobile display device 710b also mounted on the agent's pushcart 750. In some embodiments, tracking the location of an agent 740 and/or pushcart 750 within the facility may involve the agent scanning an identifier of the pushcart and an identifier of a nearby inventory area after a given number of picking or stowing operations (e.g., once every 16 picks) to determine the agent's location and/or to determine that the agent still has the correct pushcart. For example, in some facilities (e.g., small facilities or those having narrow aisles in their inventories) agents may park carts at the end of aisles during picking and stowing operations. In order to verify that the agent uses the correct cart when the agent returns to the end of the aisle, the agent may scan the cart (or a receptacle on the cart) after each picking or stowing operation. This information may be communicated to control system and an indication that the cart is the correct one, or is not the correct one, may be communicated back to the agent using a light-based display device or another communication device. In other embodiments, each cart may have a colored tag or magnet, or another distinguishing symbol mounted thereon, and the agents may use the symbol to visually verify which cart is theirs. Note that in some embodiments, scanning an identifier of a nearby inventory area may be performed as part of the normal picking and stowing operations to identify to the control system the inventory area from which an item was picked or the inventory area into which an item was placed. In such embodiments, no additional steps may need to be taken for the control system to track an agent's location within the facility.

As illustrated in FIG. 7, agent 740 may in some embodiments use a head-mounted display device (also known as a "head up" display) as a communication device, and this device may be configured for hands-free control. Such a display device may be configured to receive and display picking or stowing instructions, to direct agent 740 to inventory area 735, or to provide additional information to agent 740 to help the agent locate an item or a particular storage receptacle 700, in different embodiments. In other embodiments, other types of head up display devices may be used (e.g., one implemented as a monocle on a headset or helmet) instead of, or in addition to, a light-based display system to project visual guidance sent from a control system in the facility. In still other embodiments, the display system may be used in conjunction with an audio communication device and/or an audio-responsive communication device (not shown) configured to receive, transmit, and/or present audio guidance, instructions, and/or other information on behalf of an agent (e.g., any of the information described herein as being presented the display system or another communication device).

In some embodiments, rather than using a computer-based communication device (e.g., a light-based display system or handheld communication device, as described herein) to present picking instructions to an agent, printed pick lists may be used in conjunction with a light-based display device or a head up display device to locate items in inventory. For example, a printed pick list may include only an item identifier (e.g., a SKU, an ISBN, or a title of an item), while position and/or descriptive information may be communicated by a control system to a head up display, or other transparent or semi-transparent display device configured to present position information in front of a picking agent's eyes while still allowing a picking agent to see through the display.

As can be seen from the examples illustrated in FIGS. 3, 4, 5, 6A, 6B, and 7, various combinations of fixed-location display devices and portable display devices may be used to provide visual guidance coverage for the facility. The selection of devices and/or combinations of devices to be used in a given facility may be dependent on a variety of factors, including, but not limited to: the area that can be covered by each type of display device, the total area of the facility to be covered, safety issues (e.g., issues involving the brightness and/or power of the displays, and the availability and use of safety goggles), the supported angles of displays (e.g., ceiling-mounted display devices might not be suitable for a facility with 30-foot high ceilings and 3-foot wide aisles), or the complexity of the signals supported (and thus of the complexity of displays that may be achievable).

As noted above, the control system in a materials handling facility may be configured to send all of the information needed for a picking or stowing operation to a light-based display system at the same time (e.g., at the beginning of the operation) or may be configured to send information to the display system on a "just in time" or "as needed" basis, dependent on the location of an agent performing the operation and on the status of the operation in progress, in different embodiments. In one such embodiment, a communication device or indirect asset tracking device may be connected to a proximity awareness system and may thus be configured to automatically request position and/or descriptive information when the agent is approaching the proper inventory area. Thus, the communication device, control system, and/or a proximity awareness system may be configured to coordinate their functions such that an agent receives the information (e.g., through projection by a display device near the agent) when it is needed, thus mitigating the time the agent waits for the information to be received and presented.

The amount and/or type of information supplied to an agent using a light-based display device may vary from item to item based upon various optimization rules, according to certain embodiments. For instance, the control system may include a set of rules, heuristics, or polices that determine the amount and type of information needed to locate, identify, or distinguish an item with at least a certain level of confidence. In some embodiments, the control system may be configured to perform various types of analysis, possibly in conjunction with optimization rules or policies, in order to determine the amount and/or type of information that should be provided when picking a particular item. Thus, in some embodiments, rather than always sending all the information available for an item, only a minimum amount of information, such as determined by optimization rules, heuristics or policies, may be initially provided to picking agents.

Figure 8:
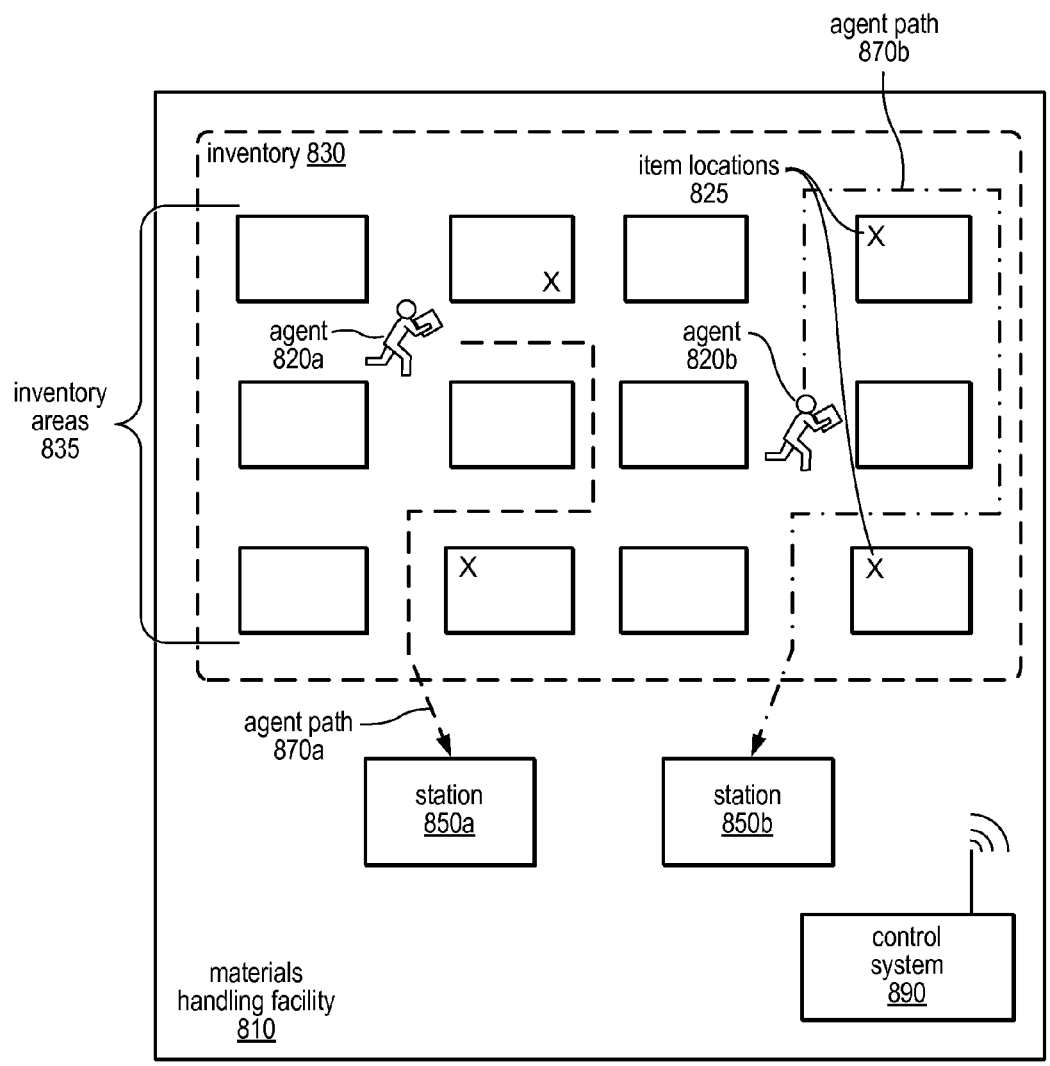
FIG. 8 is a block diagram illustrating multiple picking agents traversing a portion of a materials handling facility, according to one embodiment.

As described above, multiple picking agents may be picking items at the same time in a materials handling facility and, for some orders, no single agent may pick all the items for a single order. Instead, in some embodiments, each of several agents may pick one or more items for an order and transfer those items to a sorting station. A light-based display system may project visual guidance in the form of textual instructions, position information, pattern information, and/or path information to each agent to aid in locating items within the inventory areas. FIG. 8 is a block diagram illustrating exemplary paths of agents 820a and 820b in a materials handling facility 810 who are picking items and transporting them to stations 850a and 850b, respectively. In this example, control system 890 may be configured to determine the current locations of each of the agents 820 (as described herein) and to determine the shortest path for each of them through inventory 830 in order to pick items in fulfillment of one or more customer orders. In other embodiments, control system 890 may be configured to determine paths for each of the agents 820 so that they do not cross each other, or so that the agents 820 will not be directed to the same inventory area or aisle at the same time.

In the example illustrated in FIG. 8, once control system 890 determines a path for each of the agents 820, the agents are directed to different inventory areas in order to pick items from various item locations 825 by projection of visual guidance from one or more laser-based display devices (not shown). As illustrated in FIG. 8, the display device(s) are used to "paint" or otherwise provide an indication of a path for each of the agents using, for example, differently patterned or colored laser beams or graphical images (e.g., visually distinguishable arrows or icons) projected on the floor of materials handling facility 810 to indicate which path each agent should follow. In some embodiments, an identifier (e.g., a name, employee identifier, item group identifier, or order number) may be projected along with light beams, laser beams, or graphical images to distinguish between paths for different agents. Such identifiers may be projected as text or as graphical images, in different embodiments.

In various embodiments, control system 890 may cause an entire path 870 to be projected or painted at the same time by one or more display devices of a light-based display system, or may cause the display devices to project different portions of a path 870 as the agent traverses the path 870. For example, the portion of a path 870 from an agent's current location to the next item location 825 from which the agent should pick one or more items may be projected, and once the item(s) are picked, a portion of the path 870 from that location to the next item location 825 from which the agent should pick item(s) may be displayed. In another example, different display devices in the light-based display system may each project a segment of a path 870 on an as-needed basis as the agent traverses the path (e.g., one display device may paint a first arrow pointing straight ahead, then when the agent reaches the end of an aisle, that display device may stop projecting the first arrow and another device may project an arrow indicating that the agent should turn right, etc.). Control system 890 may be configured to determine the current location of each agent 820 within inventory 830 by any suitable means, some of which are described in more detail herein, and to communicate with the light-based display system to cause it to project different path information dependent on each agent's current location. In some embodiments, text-based visual guidance may be projected to an agent 820 to direct the agent to the appropriate item location 825, in addition to, or instead of, a path being projected by one or more display devices. For example, a display device may project visual guidance such as "walk straight ahead," "turn left at next aisle," "$2^{nd}$ shelf on right," or "follow red line."

In the example illustrated in FIG. 8, agent 820a is directed to follow path 870a, picking up items from two item locations 825 and delivering them to station 850a for further processing. Agent 820b is directed to follow path 870b, picking items from two other item locations 825 and delivering them to station 850b for further processing. As illustrated, each of the agents 820 is carrying a communication device, which may be used to display additional information for identifying and/or locating individual items at item locations 825, or which may be used to scan an identifier of an item when picked, in different embodiments.

Note that in some embodiments, control system 890 may be configured to deliberately select paths for agents 820 so that no two agents are operating in the same inventory area. In such embodiments, each display device may only be used to project visual guidance to a single agent at a time. In other embodiments, two or more agents may be working in the same inventory area or in inventory areas covered by a single display device. In such embodiments, visual guidance for the agents may be overlaid in a composite display or the display device may be programmed to project visual guidance for individual agents on an alternating or rotating basis (e.g., time-multiplexing the display). Alternating or rotating projections may be swapped quickly enough that they appear to be projected concurrently, in some embodiments, or each projection may be presented for long enough that the projections appear to be displayed one at a time. Similarly, a single display device may be capable of presenting two or more projections within a given area of inventory 830 at different positions with in the area (e.g., on different walls or in different positions on the floor), whether they appear to be displayed simultaneously or on an alternating or rotating basis. For example, in some embodiments employing MEMS technology (e.g., those that employ digital micro-mirror technology, such as Digital Light Processing, or DLP®, technology, among others), a display system may be capable of projecting differently colored images or graphics together, different symbols together, etc., with video-quality resolution.

As previously noted, a control system of a materials handling facility may be configured to provide an agent with instructions for picking or stowing items and/or with location information, position information, and/or descriptive information about items and/or inventory areas by communicating data to a light-based display system to initiate projection of such instruction in the form of visual guidance, in various embodiments. The light-based display system may then project the visual guidance to the agent to assist the agent with a picking or stowing operation. FIG. 9A illustrates a control system 900 coupled to a product database 910 in which location, position, and/or descriptive information is stored and associated with the items handled in the materials handling facility. In this example, control system 900 may be configured to consult product database 910 to retrieve information about an item and/or an inventory area and may also be configured to determine what information should be presented to picking/stowing agents for a given picking/stowing operation. For example, during a picking operation, control system 900 may access product database 910 to determine an inventory area from which a picking agent should retrieve an item. The control system may also access position and/or descriptive information for the item from product database 910. Control system 900 may be configured to determine how much of the available information should be sent to display system 940 to be projected to an agent and may process the information so that it may be presented to the agent, as described in more detail herein.

As illustrated in FIG. 9A, control system 900 may generate and exchange messages including picking/stowing instructions 920 with display system 940, in some embodiments. Display system 940 may in various embodiments be configured to receive encoded program instructions, text files, graphics files, and/or image data from control system 900. In some embodiments, software drivers for projecting received text, graphics, and/or image files may be executed by processors on the various display devices of display system 940. For example, various display devices of display system 940 may be configured to accept and project information received in one of several vector graphics formats or raster graphics formats, such as a Microsoft Windows bitmap (BMP), computer graphics metafile (CGM), graphic interchange format (GIF), PC Paintbrush format (PCX), JPEG file interchange format (JPEG), tagged image file format (TIFF), scalable vector graphic (SVG), Microsoft Windows media format (WMF), progressive graphics file (PGF), raw image format, portable network graphics (PNG), HD Photo (HDP), X Pixmap (XPM), Multiresolution Seamless Image Database (MrSID), and/or other formats.

Control system 900 may in some embodiments access product database 910 or another device to retrieve text-based item descriptions, clip art or other vector-based graphics data (e.g., drawings representing outlines of items or inventory areas), font data, images of items and/or inventory areas, or any other data that may be sent to display system 940 for display. In other embodiments, control system 900 may execute software configured to convert text, graphics, and/or image data into an input format compatible with these display devices (e.g., a machine language or other instruction encoding) before sending it to the devices. In such embodiments, the display devices may include logic for executing the encoded instructions to present the desired projected visual guidance.

In the example illustrated in FIG. 9A, picking/stowing instructions 920 may include a list of one or more items to be picked (i.e., a "pick list"), which may include item identifiers, quantities, identifiers of an inventory area in which each item on the list is stored, and/or instructions for directing an agent within the facility (e.g., path information). In another example, picking/stowing instructions 920 may include a list of one or more items to be stowed, identifiers of the items, identifiers of inventory areas in which each is to be stowed, and/or path information for directing the agent to the inventory areas. Control system 900 may be configured to send a pick list or list of items to be stowed to display system 940 as a text file, in some embodiments. These lists may be presented to an agent all at once, or information about each item on a list may be presented individually, on an as-needed basis. In some embodiments, control system 900 may be configured to send path information to display system 940 as multiple messages, one for each segment of a path, as described above. For each segment of the path, control system 900 may determine a direction and/or distance for the path segment and may generate text-based path information (e.g., "walk straight 200 yards," or "turn right") or graphics-based path information (e.g., selecting a straight or turning arrow symbol of a particular orientation from a collection of clip art or another graphics library) and may send the path information for each segment to the light-based display system sequentially, so that information pertaining to the segments may be displayed one at a time.

As illustrated in FIG. 9A, the messages sent to display system 940 may include projection instructions 960, in some embodiments. Projection instructions 960 may in some embodiments include an indication of the particular display device that should display picking/stowing instructions 920 and/or location, position, and/or descriptive information 930 (e.g., a device identifier, IP address, etc.) for a given picking/stowing operation. In embodiments in which the orientation of display devices, and/or the emitted light, may be manipulated, projection instructions 960 may also include instructions for controlling the particular display device, so that the information is displayed at the appropriate location in the facility. For example, projection instructions 960 may include instructions for placing the display device in an orientation such that its display will be presented at the desired location in the facility. The instructions may specify a direction and an angle at which the display device should be oriented so that information related to the current picking or stowing operation is projected at a specific location on a wall or floor, or so that a light beam or laser beam is directed to point to a specific position or item within an inventory area. Note that in some embodiments, the orientation and/or angle of both fixed-location display devices and mobile display devices may be manipulated, while in others, some or all of the display devices may be configured to present a display at a fixed orientation and/or angle.

Projection instructions 960 may in some embodiments include instructions for controlling how information is projected by display system 940. For example, control system 900 may generate projection instructions 960 that specify a format for projection (e.g., a light beam, a laser beam, text, or an image), a color for a projection (which may be used to distinguish between instructions for different agents, orders, or picking/stowing operations), or a duration for a projection. In some embodiments, projection instructions 960 may include a "begin display" or "end display" indication. In embodiments in which a single display device may present information for two or more different agents, orders, or picking/stowing operations, projection instructions 960 may specify whether information should be projected concurrently (e.g., overlaid) or if it should be projected in an alternating or rotating fashion. In other embodiments, control system 900 may explicitly manage such overlays or alternating/rotating projections by combining or time multiplexing the projection information before sending it to display system 940. In still other embodiments, control system 900 may select or generate projection instructions 960 from a series of predefined projection schemes or templates, which may be stored in product database 910, display system 940, or in another device configured to store such information. Projection instructions 960 may in some embodiments be sent to display system 940 as program instructions encoded within messages, and the display devices may include program instructions executable by processors to decode them and to perform the requested actions.

In the example illustrated in FIG. 9A, control system 900 may generate messages to be sent to display system 940 based on the status of the current picking or stowing operation, the current location of the picking/stowing agent performing the operation, and/or on location, position, and/or calibration information stored for the items, inventory areas, agents and/or display devices in the facility, as described herein. For example, at the beginning of a stowing operation, control system 900 may determine the location of the agent who will perform the stowing operation (as described herein) and may select a first one of a series of display devices mounted on the ceiling of the facility in the vicinity of the agent. Control system 900 may send a message to the first display device of display system 940 including machine instructions and/or data (e.g., an image file) to cause it to project a colored arrow on the floor in front of the agent indicating that the agent should proceed in a particular direction toward the inventory area in which the item should be stowed. In this example, control system 900 may send a message including stowing instructions 920, which may include path information representing a first segment of a path that the agent should take to reach the targeted inventory area. This path information may be sent as a graphic file for a red arrow symbol pointing to the left. The message from control system 900 may also include projection instructions 960 specifying the particular display device to which the message is directed, and specifying the direction and/or angle at which the display device should be oriented when projecting the red arrow symbol. This first display device may have a range such that graphics representing one or more other path segments may be sent to and displayed by the first device in turn as the agent traverses the facility toward the targeted inventory area, in some embodiments.

In this example, once the stowing agent's path is out of range of the first display device, control system 900 may select a second display device included in laser-baser display system 940 that is mounted on the ceiling of the facility (or one mounted on a wall of the facility) according to the agent's current location. Control system 900 may send a message to the second display device to cause it to project visual guidance in the form of another colored arrow on the floor in front of the agent representing another segment of the agent's target path. As the agent traverses the facility, control system 900 may select and send messages to additional display devices to cause them to project additional visual guidance in the form of path information to direct the agent to the targeted inventory area, and may send messages to cause the projections of the previously selected display devices to be turned off. Control system 900 may track the location of the stowing agent as the agent moves within the facility using various methods, including those described herein.

Once the stowing agent reaches the targeted inventory area, control system 900 may select a final display device in the vicinity of the stowing agent. Control system 900 may send a message to the final display device that includes location, position and/or descriptive information 930 and projection instructions 960 for projecting visual guidance to the stowing agent to aid the agent in locating the particular position in which the item is to be stowed, as described herein. For example, control system 900 may send a text file to the final display device that includes a description of where the item should be stowed (e.g., "top shelf, $3^{rd}$ from right," or "to left of blue box"). In another example, control system 900 may send a graphics or image file to the display device that depicts the inventory area, including an indication of where the item should be stowed (e.g., an outline drawing of a shelf having four books on it, with a symbol indicating where another book should be placed). The display device may in some embodiments be configured to receive such a text, graphics, or image file and to project the visual guidance contained therein according to the projection instructions 960 also included in the message.

The system and methods described above regarding a stowing operation may be similarly applied to a picking operation. For example, control system 900 may send similar messages to display system 940 for directing a picking agent to a particular inventory area to pick an item. When the picking agent reaches the targeted inventory area, control system 900 may select a final display device in the vicinity of the picking agent. Control system 900 may send a message to the final display device that includes location, position and/or descriptive information 930 and projection instructions 960 for projecting visual guidance to the picking agent to aid the agent in locating the particular item to be picked, as described herein. In some embodiments, control system 900 may be configured to access a product database 910 to obtain pattern information and/or position information for an item to be picked. For example, control system 900 may retrieve a text file from product database 910 that includes a description of the item and/or its position within the inventory area (e.g., "bottom shelf, orange mug," "$2^{nd}$ book to right of *War and Peace*," or "green DVD, white logo"). In another example, control system 900 may retrieve a graphics or image file from product database 910 that depicts the item to be picked (e.g., an outline drawing of the item or an image of the item). These retrieved files may be sent to the final display device by the control system along with projection instructions 960, so that the final display device may project visual guidance to the picking agent.

As noted above, in some embodiments, a control system, such as control system 900, may send a graphics or image file directly to a display device configured to support projection of visual guidance received in a standard graphics file format. Transferring such files may, in some embodiments, allow the use of relatively simple, or off-the-shelf, display devices because projecting an image may not require any analysis or interpretation of the included information in order to properly present the visual guidance (e.g., no application-specific decoding of the information may need to be performed by the display device). An image representing position information may, for example, include a diagram of a shelf or other inventory area type, along with a graphical depiction of position or direction, (e.g., an arrow) and/or a number indicating a count value corresponding to the item's position within the inventory area. In another example, an image representing position information may include a photographic image of the item in its stored position within the inventory area. In other embodiments, encoded position and/or descriptive information (e.g., pattern information) may be included in messages sent to a display device to be analyzed and/or interpreted by the display device. For example, a single byte may be used to represent a count value and a reference point for an item to be picked, and the display device may include program instructions executable to generate and then present an indication of the location of the item to be picked (e.g., graphically and/or textually). In other embodiments, however, control system 900 may be configured to send both encoded information and text, graphics, or image files including different types of information (e.g., position and/or descriptive information). For example, position information may be stored and/or sent as encoded information to be interpreted by the display device and descriptive information may be stored and/or sent as an alphanumeric string, text file, graphics file, or image file to be projected by the display device.

While the examples described above regarding FIG. 9A involve the presentation of text and/or images, in other embodiments, a light-based display system may be configured to project light beams or laser beams during the operations of the materials handling facility instead of, or in addition to, text and/or images. For example, rather than projecting an arrow on the floor to direct an agent to an inventory area, a display device may be instructed by the control system to direct a colored light beam along the path that the agent should take to reach the targeted inventory area. In another example, in order to indicate a position within an inventory area in which an item should be placed or at which a stored item can be found, a display device may be instructed by the control system to project a colored light beam directly at the position or item (as illustrated in FIGS. 6A and 6B). In such embodiments, the messages sent from control system 900 to display system 940 may include encoded instructions for directing the light beam (e.g., projection instructions 960 for manipulating the orientation, angle, and duration of the projection) and may include descriptive information 930 for projecting visual guidance of a specific color to distinguish the visual guidance from another light beam being projected nearby (e.g., a color that may be specific to the agent, the order, an item or item grouping, or a group of picking/stowing operations). In some embodiments, projection instructions 960 may also include encoded instructions for controlling the appearance of a projected light beam (e.g., whether it appears as a solid beam, a pulsing or flashing light, an oscillating light pattern, etc.).

As illustrated in FIG. 9B, projection instructions 960 may also include encoded instructions for manipulating one or more mirrors 970 in the facility, as described above. For example, projection instructions 960 may be configured to control the position, orientation, or angle of mirrors 970, so that light emitted or projected by one or more display devices of display system 940 is reflected by mirrors 970 and displayed at a location visible to an agent. In another example, projection instructions 960 may be configured to cause mirrors 970 to assume a sequence of positions, so that when light emitted or projected by one or more display devices of display system 940 is reflected by mirrors 970, the desired image (e.g., visual guidance) is created by the reflection. In yet another example, control system 900 may provide instructions to a liquid crystal-based display system (not shown) to control the reflection of light emitted or projected by one or more display devices of display system 940. Note that in some embodiments, instructions encoded to control mirrors 970 may be separate from projection instructions 960 and may be communicated to mirrors 970 independent of the communication of projection instructions 960 to display system 940.

As described above regarding the example illustrated in FIG. 9A, the information retrieved from product database 910 (e.g., location, position, and/or descriptive information 930), along with picking/stowing instructions 920 (e.g., a pick list), may be processed by control system 900 into various messages and communicated along with projection instructions 960 to display system 940. In some embodiments, control system 900, mirror(s) 970, and the display devices of display system 940 may each be configured to communicate wirelessly, for example via radio communication or wireless networking, to convey instructions and information from control system 900 to display system 940 for presentation to agents. In other embodiments, they may communicate via a wired connection protocol.

Control system 900 may communicate with the display devices of display system 940 according to any of a number of different communication protocols, such as via TCP/IP, HTTP, 802.11, Bluetooth, etc. As illustrated in FIG. 9A, control system 900 may send a message including picking/stowing instructions 920, location, position, and/or descriptive information 930, and/or projection instructions 960 to display system 940, according to various embodiments. In embodiments in which the display device is configured to receive encoded location, position and/or descriptive information and to analyze or interpret it for projection, the number of bytes required to transmit the location, position, and/or descriptive information 930 may be small enough that attaching it to a message that is already being sent may be more efficient than the overhead required to send another message just for the additional information. For example, position or pattern information (e.g., a count value corresponding to an item's position on a shelf, or an encoded indicator of an item's color) may be small enough to insert into an unused field of an existing message, such as one used to send picking/stowing instructions 920, and may therefore be sent with no or almost no increase in required bandwidth, according to certain embodiments.

In another example, different portions of the data (e.g., different sets of bits in a byte) may represent different aspects of location, position, and/or descriptive information 930. For example, one nibble may represent a count value or distance from a given reference, while another nibble may indicate the reference itself, such as by specifying one or more of a side of the inventory area, a direction, a marker item or divider, a row or stack, etc. (e.g., "from left side," "from top," "to right of blue marker," "in second row," "in fourth stack," etc.). Thus, in one embodiment, a single byte may be able to represent any combination of 16 distance counts and 16 different references. In another example, one nibble of a byte may represent a primary color of an item, while another represents secondary pattern information (e.g., the color of a title or logo). In other embodiments, different and/or more complex encoding schemes may be used. In embodiments in which both position information and descriptive information are used, they may be encoded separately in a total of two or more bytes, or both position and descriptive information may be encoded in a single byte, such as if each is encoded in one nibble of the same byte. Sending other types of information, such as graphics or image data, may require that a longer message or a separate message including location, position, and/or descriptive information 930 (e.g., an image file) be sent from control system 900 to display system 940.

As previously noted, in some embodiments, a display system may be used in conjunction with other communication devices, such as handheld communication devices. FIG. 9B illustrates one embodiment in which control system 900 communicates some information to display system 940 and other information to a communication device 950. In this example, picking/stowing instructions 920 (e.g., pick lists or lists of items to be stowed) may be sent to communication device 950, while location, position, and/or descriptive information 930 and projection instructions 960 may be sent to one or more display devices. In other embodiments, information sent to one or the other of display system 940 and communication devices 950 may be partitioned differently or may be partitioned on a context-sensitive basis. For example, in one embodiment, control system 900 may determine whether to use a display system 940 or a communication device 950 to present information for a given stowing or picking operation dependent on which agent is performing the operation, or this may be selectable by the agent. In another embodiment, control system 900 may determine whether to use a display system 940 or a communication device 950 to present information for a given stowing or picking operation dependent on the number or type of items to be picked or stowed, on the number of agents working in close proximity in inventory, on the configuration of a section of the inventory in which the targeted inventory area is located, or using other criteria.

While the examples illustrated in FIGS. 9A and 9B include a product database, 910 coupled to control system 900, in which location, position and/or descriptive information for items and inventory areas is stored, in another embodiment, control system 900 may access some or all of this information across a network from another device configured to store and provide such information (not shown).

Figure 10A:
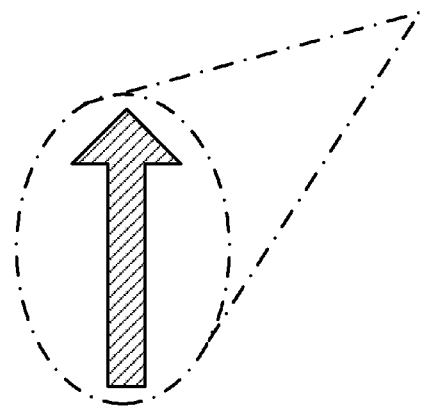
FIGS. 10A-10F illustrate examples of light-based displays usable in various operations, according to different embodiments.
Figure 10B:
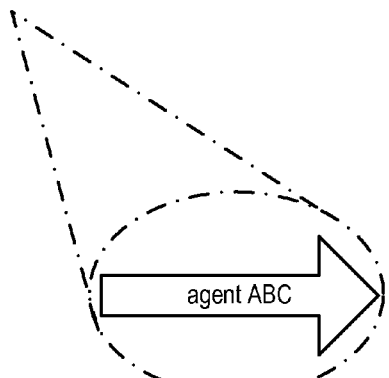
Figure 10C:
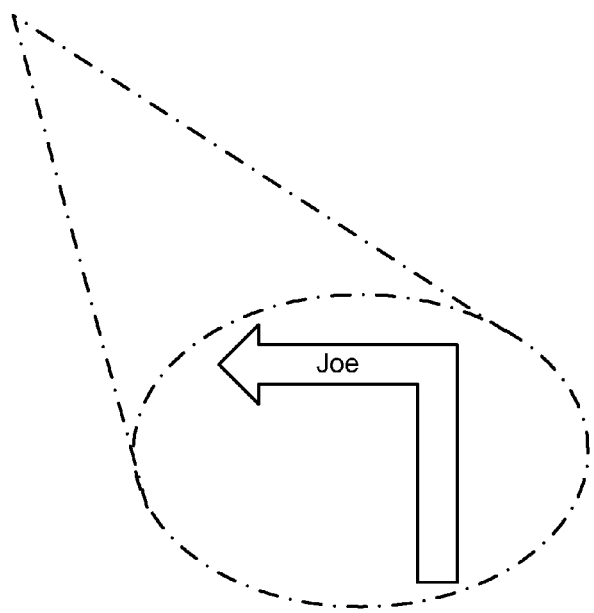

As previously noted, light-based display devices may be capable of projecting one or more of various types of visual guidance, including, but not limited to, light beams, laser beams, text-based displays, graphics-based displays, and/or images, in different embodiments. These projections may be used, for example, to direct an agent to a particular inventory area for picking or stowing, or to provide additional information for locating a particular position or item within an inventory area. As previously noted, in some embodiments different information may be presented to an agent in the facility using a light-based display system depending on the agent's current location. FIGS. 10A-10F illustrate examples of visual guidance that may be projected by a light-based display device during various operations of a materials handling facility. FIG. 10A illustrates the projection of visual guidance in the form of an arrow. In some embodiment, a colored arrow may be presented to an agent to direct the agent along a given path (e.g., as an indication to continue straight ahead), to point to an inventory area (e.g., a shelving unit or pallet), or for other purposes, in different embodiments. As noted above, the color of a projected arrow may in some embodiments be specific to a given agent, customer order, or other item grouping, or may be used to identify a receptacle into which a picked or stowed item should be placed. FIG. 10B is similar to FIG. 10A in that it depicts the projection of visual guidance in the form of an arrow. In this example, however, an identifier of an agent is explicitly projected in text (e.g., "agent ABC") along with the arrow. Projecting an identifier of an agent may be useful when an agent is color blind, or in embodiments in which a display device is only capable of projecting one color display, for example. This arrow may indicate to an agent that the agent should turn to the right or that the agent should continue in the direction of the arrow, in some embodiments. In other embodiments, this arrow may point to an inventory area or other portion of the facility (e.g., to another room or a door to another room, or to a particular aisle, pallet, conveyor belt, sorting station, packing station, or other inventory module). Similarly, FIG. 10C illustrates a projection of visual guidance in the form of a symbol that includes a left turn, an arrow, and an agent's name or identifier in text (e.g., "Joe"). This projected symbol may indicate that Joe should make a left turn at the next aisle intersection, or may indicate that Joe should turn to his left to face an inventory area to which he is being directed, for example.

Figure 10D:
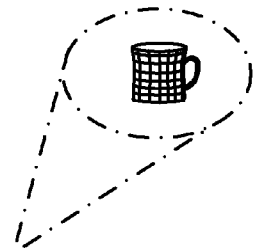

As illustrated in FIG. 10D, a light-based display device may be used to project an image of an item to be picked. In this example, an image of a mug is projected, which may be used to distinguish a mug to be picked from among other mugs or other types of items stored in an inventory area. In different embodiments, images projected by a light-based display device may represent scanned images, photographic images, or graphical images representing an item (e.g., a line drawing representing an outline or other view of the item) stored in a database and associated with an item. A control system may access one or more of these images and communicate it to a light-based display system to be projected to an agent when the agent begins a picking operation, when the agent reaches the inventory area from which the item is to be picked, or at any other time during a picking operation, in different embodiments.

Figure 10E:
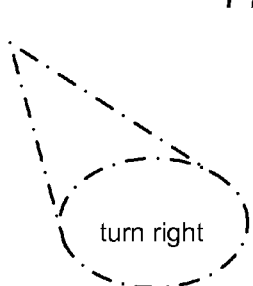

FIG. 10E illustrates a text-based projection of visual guidance directing an agent within the facility (e.g., "turn right"). As previously noted, such visual guidance may be presented in the context of an agent's current location and position, as determined by a control system. For example, if the agent has not yet reached an inventory area in which the agent will pick or stow an item, visual guidance may direct the agent toward the inventory area from the agent's current location. If the agent has reached the targeted inventory area, these instructions may direct the agent to turn to the right in order to face the inventory area and locate the particular position or item that is the object of the current stowing or picking operation. Note that in some embodiments, agent-specific information sent to the display system may indicate that the agent speaks a language other than English, and the display system may be configured to present guidance in another language. For example, if Joe speaks French and if the path data indicates that Joe should turn right, the instructions provided to the display device may cause the display device to project the instructions "turn right" in French, rather than in English. In such embodiments, if a different agent were directed on the same path (e.g., to pick the same item), the guidance may be presented in a different language (e.g., Spanish, English, or any other language).

Figure 10F:
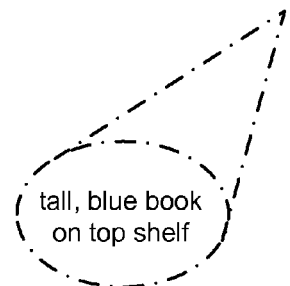

As illustrated in FIG. 10F, a light-based display device may be used to project visual guidance to a picking agent to locate and identify an item to be picked from within an inventory area. In this example, the projected visual guidance is in the form of text and includes both descriptive information (e.g., "tall, blue book") and position information (e.g., "on top shelf"). This descriptive and position information may be accessible by a control system from a database in which the information is associated with an identifier of the targeted item. This information may in some embodiments be enough information to distinguish an item to be picked from among other items in an inventory area.

As noted above, the amount and type of information to be presented in such a display may be determined by the control system, and may be dependent on whether the item is readily distinguishable from other items in the inventory area, a track record of one or more agents in picking this item or other similar items, on guidelines associated with this or similar items, or on other factors, in different embodiments. For example, in some embodiments, a complete description of an item (including, for example, a title, pattern information, size or dimension information, shape, and/or position information) may be projected all at the same time, while in other embodiments, a "rolling" description may be projected such that more information is presented the longer it takes the agent to locate the item. In another embodiment, path, position, and descriptive information may all be projected as a rolling projection as a picking or stowing operation progresses. Such a rolling projection may be similar in appearance to a movie being projected at a given location in the facility, or as a movie projected near a picking or stowing agent by a mobile device as the agent traverses the facility, in different embodiments.

Figure 11:
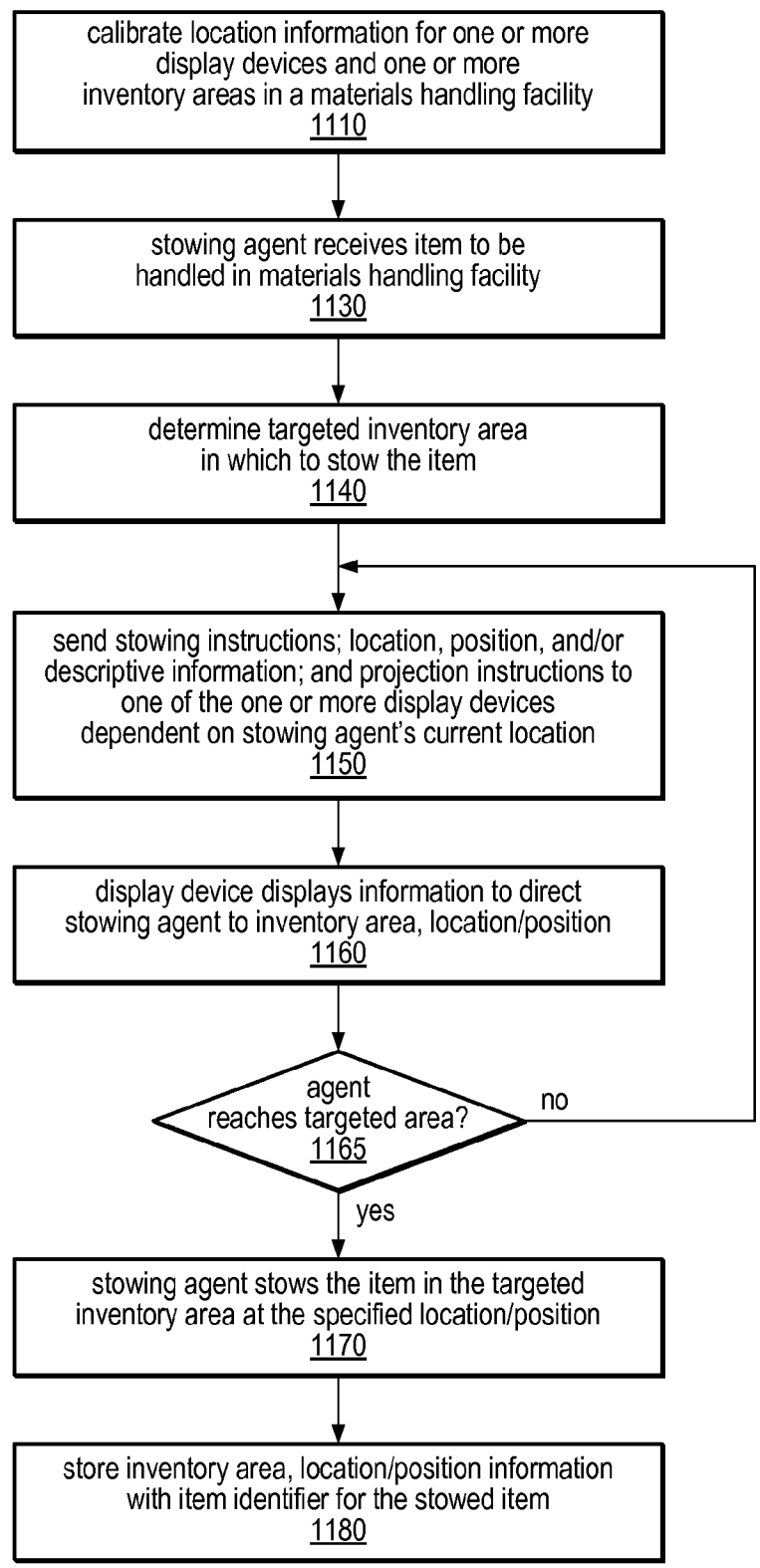
FIG. 11 is a flowchart illustrating one embodiment of a method for using display devices in an item stowing operation.

As described herein, a light-based display system may be used in a stowing operation in order to direct an agent to a particular inventory area (e.g., by projecting path information, or "lighting the way"), to illuminate the inventory area (e.g., a shelving unit, pallet, inventory module, door, etc.), and/or to identify a particular location within an inventory area where an item should be stowed (e.g., a shelf, a bin, or a particular position on a shelf). One embodiment of a method for using a light-based display system in a stowing operation of a materials handling facility is illustrated in FIG. 11. In this example, prior to using the display system, the location of various components of the system may be determined and/or calibrated according to the layout and arrangement of the facility, as in 1110. For example, the method may include calibrating position information for one or more fixed-location display devices in the facility. Similarly, the method may include calibrating position information for one or more inventory areas within the facility. Calibration may be performed as described in examples herein, or using another method, in various embodiments. For example, markers, stickers, or RFID tags may be added to mirrors, walls, floors, shelving units, doorways, pillars, etc., and the known locations of these fixed-location references may be used to calibrate the position of display devices, individual inventory areas, and/or individual items already stored within the facility. The calibration of these components to fixed references may enable a control system to direct an agent to a targeted inventory area and to locate a particular position in which an item is to be stowed. Note that if the materials handling facility is reconfigured, the display devices may in some embodiments remain in the same fixed-locations and only the locations of the inventory areas may need to be re-calibrated. In other embodiments, when the facility is reconfigured, the display devices may be re-located to provide better display coverage within the reconfigured facility. In such embodiments, their locations may also need to be re-calibrated with respect to fixed-location references.

In the example illustrated in FIG. 11, a stowing operation begins at 1130, when a stowing agent receives an item to be handled in the facility. The facility may have received the item through a receiving station, such as receiving station(s) 180 of FIG. 2. The stowing operation may continue with a determination of a targeted inventory area in which the item is to be stowed, as in 1140. In some embodiments, multiple, different product items may be stored together in a single inventory area, such as a shelf, rack, bin, or drawer. Different methods may be used to determine one of a plurality of inventory areas in which to stow the item, as described herein. For example, an inventory area may be determined for each item automatically, such as by software executing on a control system, in some embodiments. In some embodiments, such software may automatically determine one or more inventory areas in which to stow the item such that the item may be easily distinguishable from other co-located items.

As illustrated in FIG. 11, the method may include sending data to a light-based display system, as in 1150. The data may include stowing instructions; location, position, and/or descriptive information; and projection instructions. The particular display device to which the data is sent may in some embodiments be dependent on the stowing agent's current location within the facility. For example, initial data to be displayed to direct the stowing agent toward the targeted inventory area may be sent to a fixed-location display device near the stowing agent, or may be sent to a mobile display device mounted on a pushcart manipulated by the stowing agent for this stowing operation, in different embodiments. Various methods may be used to determine the stowing agent's current location, including, but not limited to, those described above.

The display device that received the data may project visual guidance to direct the stowing agent to the targeted inventory area, and/or to a particular location/position within the targeted inventory area, as in 1160. As described herein, the display device may project visual guidance that includes one or more of a light beam, a laser beam, text, graphics, or images suitable for directing the stowing agent, in different embodiments.

If the stowing agent does not reach the targeted inventory area based on the initial information presented, shown as the negative exit from 1165, the method may include sending additional data to the display system dependent on the stowing agent's new location. This is illustrated as the feedback loop from 1165 to 1150 in FIG. 11. This additional information may in some embodiments be sent to a different one of a plurality of display devices (e.g., in the case of fixed-location display devices with relatively small projection ranges) or to the same display device as in the previous projection step (e.g., in the case of a mobile display device moving with the stowing agent, or in the case that the previously selected fixed-location display device is capable of longer-range projections). In either case, the additional information may be usable to direct the stowing agent to the targeted inventory area, and/or to a particular location/position within the targeted inventory area, as in 1160. In this example, the operations illustrated in blocks 1150, 1160, and 1165 may be repeated until the stowing agent reaches the targeted inventory area, illustrated by the positive exit from 1165.

Once the stowing agent reaches the targeted inventory area, the agent may stow the item in the targeted inventory area at a location and/or position specified in the visual guidance projected by the display system, as in 1170. As described above, the item's location and/or position may have been determined according to positional placement guidelines, in some embodiments, or according to guidelines for placing items such that they are easily distinguished from other items within the inventory area. In some embodiments, visual guidance indicating the specific position in which the item should be placed may be presented to the stowing agent (e.g., "$2^{nd}$ book from right, top shelf," or "stow to left of black camera"), while in others, the information presented may include a description of the placement guidelines to be used when stowing the item (e.g., "add new items on the right," or "place with items having dissimilar colors"). In one embodiment, an image may be presented to the stowing agent representing the inventory area itself that includes an indication of where the item should be stowed. For example, an outline drawing or photographic image of the inventory may be overlaid with an arrow or other symbol indicating where the item should be stowed.

As illustrated in FIG. 11, after the item is stowed, the method may include storing an indication of the inventory area and/or location/position information for the stored item in a product database, such as product database 910. This indicator may include a description of the inventory area, an inventory area location number, or other data representing the inventory area in which the item is stored in the facility, indexed by a product identification code, for example. In some embodiments, an indicator of the item's specific position within the inventory area may be associated with the corresponding item's identifier, and may be stored in such a database along with an identifier of the item and/or an identifier of the inventory area. In some embodiments, pattern information, dimension information, and/or other descriptive information may also be stored in the database along with position information at this time, while in other embodiments such information associated with the item may be stored separately and/or at a different time. As previously noted, an identifier of the item may include an item's inventory identification number, UPC, SKU code, ISBN, model number, version number and/or other designation (including proprietary designations), according to various embodiments.

In some embodiments, a position indicator may include a time stamp of the stowing operation, and this may be captured and associated with the item when it is stowed. Storing the data and time of the stowing operation for each item as it is added to an inventory area may provide enough information for the control system to determine the item's position in the area, in some embodiments. For example, if items are always added to the right of any items already in the inventory area, the control system may be configured to determine the order in which items were stored by sorting the time stamps associated with each of the items. In this example, the item that was placed in the inventory area first (earliest) will be on the far left, the item stowed second will be immediately to its right, and so on, and the last item added will be farthest to the right. In this example, the item associated with the third oldest time stamp may be the third item from the left, and the item associated with fourth oldest time stamp may be the fourth item from the left, and so on. The use of time stamps may allow the control system to determine an item's position relative to other items in the inventory area. In some embodiments a time stamp may be captured automatically when an item is stowed in an inventory area, such as if an item identifier and/or inventory identifier is scanned at the time of placement according to the standard stowing operation. In other embodiments, an agent may enter a date and/or time using a communication device when the agent stows an item in an inventory area, or may explicitly trigger capturing and storing a time stamp, such as by pressing a button on a communication device to indicate that the item has been stowed, or by some other means. An indication of the determined position may then be displayed using a light-based display device, as described herein.

A position indicator may in some embodiments include an item count value or item index, rather than, or in addition to, a time stamp. For example, a control system, such as control system 900, or a database, such as product database 910, may store a current item count for each inventory area, which is incremented when an item is placed in the inventory area for storage and decremented when an item is picked (removed) from the area. In such embodiments, when an item is placed in the inventory area, the inventory area's current item count is incremented. In one example, if there were four items in the inventory area when a fifth is added to the area, the fifth item may have the count value "5" associated with it, indicating that it is the fifth item in the area. The inventory area's current item count may be automatically incremented when an agent provides an indication that the item has been stowed (such as by scanning an identifier of the item and/or the inventory area), or the agent may explicitly trigger an increment of the inventory area count, such as by pressing a button or entering a count using a communication device, in different embodiments. The incremented item count may be stored in a control system, such as control system 900, or a database, such as product database 910, and associated with an identifier of the item that was placed and/or an identifier of the inventory area, in some embodiments. In embodiments in which items are placed according to positional placement guidelines, this item count value may, thus, correspond to the item's position within the inventory area. For example, if items are always added on the right, an item associated with an item count value of 3 may be the third item from the left hand side of the inventory area. In embodiments using an item count value as a position indicator, when an item is picked from an inventory area, the inventory area's current item count may be decremented. In some such embodiments, the item count values for one or more other items in the area may be updated to reflect that the item was removed and their positions have changed. The use of item count values may in some embodiments allow the control system to determine the position of an item so that an indication of the position may be displayed using a light-based display device, as described herein.

As described above, a light-based display system may also be used in a picking operation in a materials handling facility to direct an agent to a particular inventory area (e.g., by projecting path information, or "lighting the way"), to illuminate the inventory area (e.g., a shelving unit, pallet, inventory module, door, etc.), to identify a particular location within the inventory area (e.g., a shelf, a bin, or a position of a shelf) or to identify an item itself (e.g., by projecting a light beam or a laser beam toward the item to be picked, and/or shining a dot on the item). One embodiment of a method for using a light-based display system in a picking operation is illustrated by the flow chart in FIG. 12. In this example, as in the example illustrated in FIG. 11, the method may include calibrating position information for one or more display devices and one or more inventory areas in the facility, as in 1210. The picking operation may then begin at 1220, when a picking agent receives a pick list including a given item to be picked.

Figure 12:
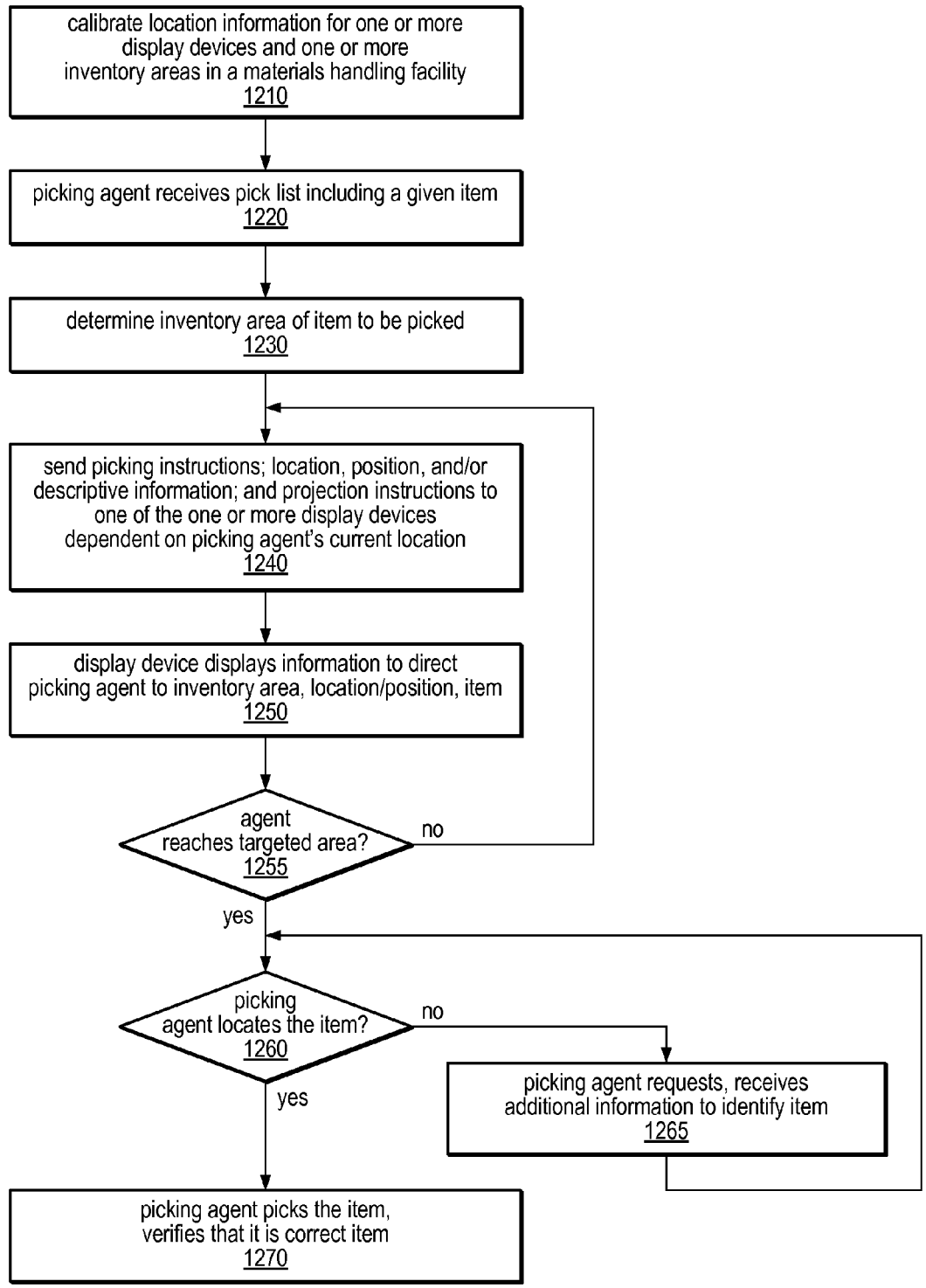
FIG. 12 is a flowchart illustrating one embodiment of a method for using display devices to locate items in inventory in a picking operation.

As illustrated in FIG. 12, the method may include determining an inventory area in which the given item is stored, as in 1230. For example, in some embodiments a control system, such as control system 900, may access a product database, such as product database 910, in order to obtain stored location information, position information, and/or descriptive information about the given item. This information may have been stored when the given item was stowed, as described above, or at another time, in different embodiments. For example, descriptive information may be stored when an item is received at the facility, or location information may be stored when a targeted inventory area is determined, but before it is stowed. In some embodiments, the control system may also obtain information about other items stored in the same inventory area from the product database.

In the example illustrated in FIG. 12, the control system may be configured to obtain position information and descriptive information for the given item at the same time that it obtains location information. In other embodiments, different amounts and/or types of information may be obtained by the control system at different times. For example, location information may be obtained and used to direct a picking agent to a targeted inventory area, and then additional information (e.g., position and/or descriptive information) may be obtained to assist the picking agent in locating the given item within the inventory area. As illustrated in FIG. 12, once an inventory area in which the given item is stored has been determined, the method may include sending data to a display system usable to direct the picking agent in the picking operation, as in 1240. As described above, data sent to one of a plurality of display devices in a materials handling facility may include picking instructions (e.g., a pick list), location, position, and/or descriptive information; and display information.

Location information may include a description of the inventory area, an inventory area location number, or other data representing the inventory area in which the given item is stored in the facility, indexed by a product identification code, for example. In some embodiments, position information (i.e., an indicator of the item's specific position within the inventory area) may include a time stamp, item count value, or other position indicator. For example, if a time stamp is used as a position indicator, the control system may calculate the item's position with respect to one side of the inventory area by sorting the data associated with the items in the inventory area to determine the sequence of items according to their time stamps. Similarly, if an item count value is used as a position indicator, the control system may be configured to determine the item's position by sorting the data associated with the items in the inventory and determining the sequence of items according to their item count values. In other embodiments, the count value itself may represent the item's position with respect to a standard reference.

Descriptive information for the given item may in various embodiments include a product identifier (as described above), pattern information associated with the given item (e.g., one or more colors visible on the item, its markings, or its packaging), dimension information associated with the given item (e.g., indications of its dimensions and/or shape), or one or more images of the given item (e.g., outline drawings or photographic images). In some embodiments, the control system may be configured to use information about other items in the same inventory area to determine how much information and/or what type of information may be useful in locating the given item in the inventory area. For example, the control system may determine that the given item is the only one of a given item type in the area (e.g., the only camera), the only item associated with certain pattern information (e.g., the only blue book in the area), or that the item may be distinguishable by its size or shape (e.g., it is the tallest box on a particular shelf). In another example, the control system may be configured to determine the position of the given item relative to another, more easily distinguishable, item in the inventory area (e.g., $2^{nd}$ book to left of War and Peace, or $3^{rd}$ book to right of video camera).

As illustrated in FIG. 12, the display device may project the data to direct the picking agent to the inventory area where the given item to be picked is stored, as in block 1250. The data may be presented in any one of a number of different formats. For example, the display device may project visual guidance in the form of one or more of a light beam, a laser beam, text, graphics, or images suitable for directing the picking agent to the inventory area or for assisting the picking agent in identifying the item to be picked, in different embodiments. As noted above, the amount and/or type of information sent and the particular one of the display devices to which it is sent may be dependent on the picking agent's current location in the facility. Various methods may be used to determine the stowing agent's current location, including, but not limited to, those described above.

If the picking agent does not reach the targeted inventory area based on the initial information presented, shown as the negative exit from 1255, the method may include sending additional data to the display system dependent on the picking agent's new location. This is illustrated as the feedback loop from 1255 to 1240 in FIG. 12. This additional information may in some embodiments be sent to a different one of a plurality of display devices (e.g., in the case of fixed-location display devices with relatively small projection ranges) or to the same display device as in the previous display step (e.g., in the case of a mobile display device moving with the picking agent, or in the case that the previously selected fixed-location display device is capable of longer-range projections). In either case, the additional information may be usable to direct the picking agent to the targeted inventory area, and/or to a particular location/position within the targeted inventory area, as in 1240. In this example, the operations illustrated in blocks 1240, 1250, and 1255 may be repeated until the picking agent reaches the targeted inventory area, illustrated by the positive exit from 1255.

Once the picking agent reaches the targeted inventory area, the agent may attempt to locate the item to be picked based on the information already displayed by the display system. As noted above, this information may include position and/or descriptive information, in different embodiments. For example, visual guidance indicating the specific position of the item within the inventory area may be presented to the picking agent (e.g., "$2^{nd}$ book from right, top shelf," or "box to left of black camera"), or the visual guidance presented may include a description of the given item (e.g., "tall, red box," or "wide blue book"). In one embodiment, visual guidance may include an image presented to the picking agent representing the given item. For example, the display device may project an outline drawing or photographic image of the item.

If the picking agent is not able to locate the item using the presented information, shown as the negative exit from 1260, the agent may request additional information to assist the agent in locating the item, as in 1265. For example, additional position or descriptive information may be requested and received (e.g., if these were not provided earlier), so that the item may be identified. As shown in FIG. 12, the operations illustrated by blocks 1260 and 1265 may be repeated one or more times if the picking agent is having trouble locating the given item. In some embodiments, if the picking agent is still not able to locate the given item, the picking agent may provide feedback to the control system indicating that the item was not found. In other embodiments, if the picking agent is not able to locate the item from the presented information, the picking agent may be instructed to keep looking in the area (e.g., to request still more information or to read the titles or labels of all the items) before giving up, or may be instructed to move on to another item on their pick list. In either case, if the item is not found, the agent may provide feedback to the control system indicating that the item was not found and another attempt to locate the item may be made at another time, such as during an investigation of the reported feedback.

If the agent is able to locate the item, shown as the positive exit from 1260, the agent may remove the item from the inventory area, or "pick" the item, as in 1270. In some embodiments, when an item is picked, an indication of success may be sent to the control system, which may update the product database to reflect the removal of the given item. The control system may also update position information for one or more of the remaining items in the inventory area based on the removal of the given item. If the item was found in the inventory area, but not in the position indicated by the presented position information, the agent may provide feedback to the control system indicating that an error was detected in the determined and/or stored position information for the item (not shown).

As illustrated in FIG. 12, after the item is picked, the method may include verifying that the correct item was picked, as in 1270. For example, in some embodiments, when the picking agent picks the given item, the agent may scan an identifier of the item (e.g., using a handheld communication device). As previously noted, an identifier of the item may include an item's inventory identification number, UPC, SKU code, ISBN, model number, version number and/or other designation (including proprietary designations), according to various embodiments. The picking agent may send the item identifier to the control system (e.g., using the communication device), which may compare the identifier to that of the item on the pick list. In such embodiments, the control system may send an indication to the picking agent that the correct item was or was not picked by sending the indication to the communication device and/or to the display system to be presented to the agent.

In one embodiment, only position information may be initially provided for projection by the display system and the picking agent may request additional information through a button or other user interface control of a communication device. In response, the control system may provide descriptive information to be presented by the display system. In another embodiment, the control system may initially provide no descriptive or position information to the display system and may provide this information only after the picking agent requests the information. For example, the initial picking instructions may only include text representing a title or label on the given item and if the agent is not able to quickly locate the correct item, the agent may request position information, descriptive information, or both. In another embodiment, the control system may be configured to provide only an item's title and/or descriptive information to the display system initially, but may then provide position information for presentation if a picking agent requests additional information or if the picking agent is taking a longer time than usual (or longer than a configurable time) to locate the item. In yet another embodiment, the control system may be configured to provide additional information to be presented by the display system if the picking agent scans (e.g., using a scan-code reader) an incorrect item. In some embodiments, the amount or fidelity of the presented information may vary based upon the availability of network resources, such as network bandwidth, control system 900, and/or product database 910.

Many of the operations illustrated by the flowcharts in FIGS. 11 and 12 may be suitable for automation, according to various embodiments. The amount of automation may vary from embodiment to embodiment. For example, in one embodiment, the entire receiving and stowing process may be completely automated using various conveying and scanning means to move the item within the facility and associate position and/or descriptive information with the item. In one such embodiment, software executing on a control system, such as control system 900, may be configured to automatically determine pattern information and associate the pattern information with the item based upon an automated identification of the item, such as through the automated scanning of a bar-code, and may store the pattern information in a product database, such as product database 910. The software may also be configured to automatically determine one or more inventory areas in which to stow the item such that the item may be easily distinguishable based on the determined pattern information, from other co-located items, and may store an identifier of the inventory area in product database 910. In some embodiments, the software may also be configured to determine the item's position within the inventory area, based on positional placement guidelines followed by automated stowing means or by automatically capturing the position of the item using automated scanning. The software may then associate a position indicator with the item. In one embodiment, dimension information may be automatically determined and/or estimated for each item by the control system and may be associated with the item in the product database.

In embodiments in which various steps of a stowing operation are automated, agents may still use a light-based display system in a manual or semi-automated picking operation. For example, in one embodiment, pick lists may be automatically generated by control system 900. Similarly, control system 900 may be configured to automatically determine the location of one or more agents within the facility, a targeted inventory area for a picking operation, a path from the current location of the picking agent to the targeted inventory area, and position and/or descriptive information associated with an item to be projected by a light-based display device. Control system 900 may then generate and send messages to a light-based display system to direct an agent in the picking operation, as described herein. Control system 900 may also be configured to automatically track the location of the picking agent and the progress of the picking operation, using scanners, cameras, or other communication devices configured to automatically detect identifiers of agents, items, and/or other components in the facility.

Although many of the examples described herein involve the use of a light-based display system in picking and/or stowing operations of a materials handling facility, such a display system may also be used in other operations within the facility. For example, in a sorting or packing operation, the control system may be configured to send data to a light-based display device to initiate the projection of a light beam, a laser beam, or other information to identify a bin, tote, shelf, or station to which one or more items should be transferred, a recommended container for a group of items, a hopper into which one or more items should be placed, a conveyor belt on which one or more items should be placed, or a slot through which one or more items should be passed. In another example, in a shipping operation, the control system may be configured to send data to a light-based display device to initiate the projection of a light beam, a laser beam, or other information to identify a shipping lane (e.g., one associated with a particular carrier, truck, or set of zip codes associated with a shipment), or to identify a pallet or container to which items or item packages should be transferred for shipping. The control system data may identify the pallet, container or shipping lane based upon detecting or observing a UPC, SKU code, ISBN, visual image or other identifier of the items or item packages (e.g., read UPC and identify the path or shipping lane data as "Place on conveyor belt 2"). In yet another example, in a receiving operation, the control system may be configured to send data to a light-based display device to initiate the projection of visual guidance in the form of a light beam, a laser beam, or other information to identify the next box to process (e.g., by pointing to or describing a carton to be opened), based on information captured by a camera, scanner, or other sensing device. In some embodiments, the control system may be configured to send data to a light-based display system (or one or more light-based display devices) for projection of information usable to direct an agent to a sorting operation, a packing operation, a shipping operation, a receiving operation, or to any other location within the facility along a path determined by the control system, as described herein.

A light-based display system may also be used to direct an agent to an inventory area to perform inventory management operations other than picking and stowing, in some embodiments. For example, an agent may be directed to an inventory area by the display system to count the items in the area, or to count the number of items in the area having a given UPC, SKU code, ISBN, or other identifier. In another example, an agent may be directed to an inventory area by the display system to verify that information stored in an inventory management database regarding the items in the area is accurate, to scan one or more items in the area in order to populate or update an inventory management database, to place labels or other identifiers on one or more items, or to replace incorrect labels or other identifiers on one or more items (e.g., in response to an exception process being initiated during a previous operation in the area). Other similar uses of a light-based display system in a materials handling facility are contemplated.

Although the system and methods described herein have been illustrated by way of several examples involving laser-based display systems, it will be understood by those skilled in the art that the system and methods may be applied in materials handling facilities employing other types of light-based display devices, or a combination of laser-based display devices and other types of light-based display devices. For example, in some embodiments, visual guidance, such as path information, item location and description information, and/or instructions for performing various operations in the facility may be projected to agents using a light-based projection system that includes one or more fixed-location, portable, or embedded light-based projection display devices (e.g., embedded in a communication device or another component within the materials handling facility) or one or more wearable light-based projection display devices (e.g., integrated into glasses or helmets). In one embodiment, a video projector may be configured to display one or more of a library of many images (potentially thousands or millions of images), either singularly or in combination, to create the visual guidance described herein and/or to display images of items and/or inventory areas. In some embodiments, display devices may project images that are visible even on a noisy background (e.g., a shelving unit of an inventory area) and may always be in focus. In one embodiment, a display device may be configured to project an image that is solid black everywhere except in the specific location where an item is to be stowed or from which it is to be picked, but is white in that specific location. In yet another embodiment, visual guidance may be projected to agents using LEDs embedded in the floor, walls, shelving units, and/or containers of a materials handling facility. Projection of various forms of visual guidance using the LEDs may be initiated and/or controlled by a central control system, as described herein.

A light-based display system, as described herein, may be utilized in a number of different facilities and situations, including, but not limited to material handling facilities, order fulfillment centers, rental centers, distribution centers, packaging facilities, shipping facilities, libraries, museums, warehouse storage facilities, shopping centers, grocery stores, car parking lots, etc. For example, such a display system may be utilized in a garage of a car rental agency or a valet parking service to direct an employee or a customer to a particular parking spot in which to park a car, or from which to retrieve a car, based on instructions sent to one or more light-based display devices in the garage from a central control system. In general, a light-based display system may be used in any situation in which stowing and/or picking type operations are performed.

Figure 13:
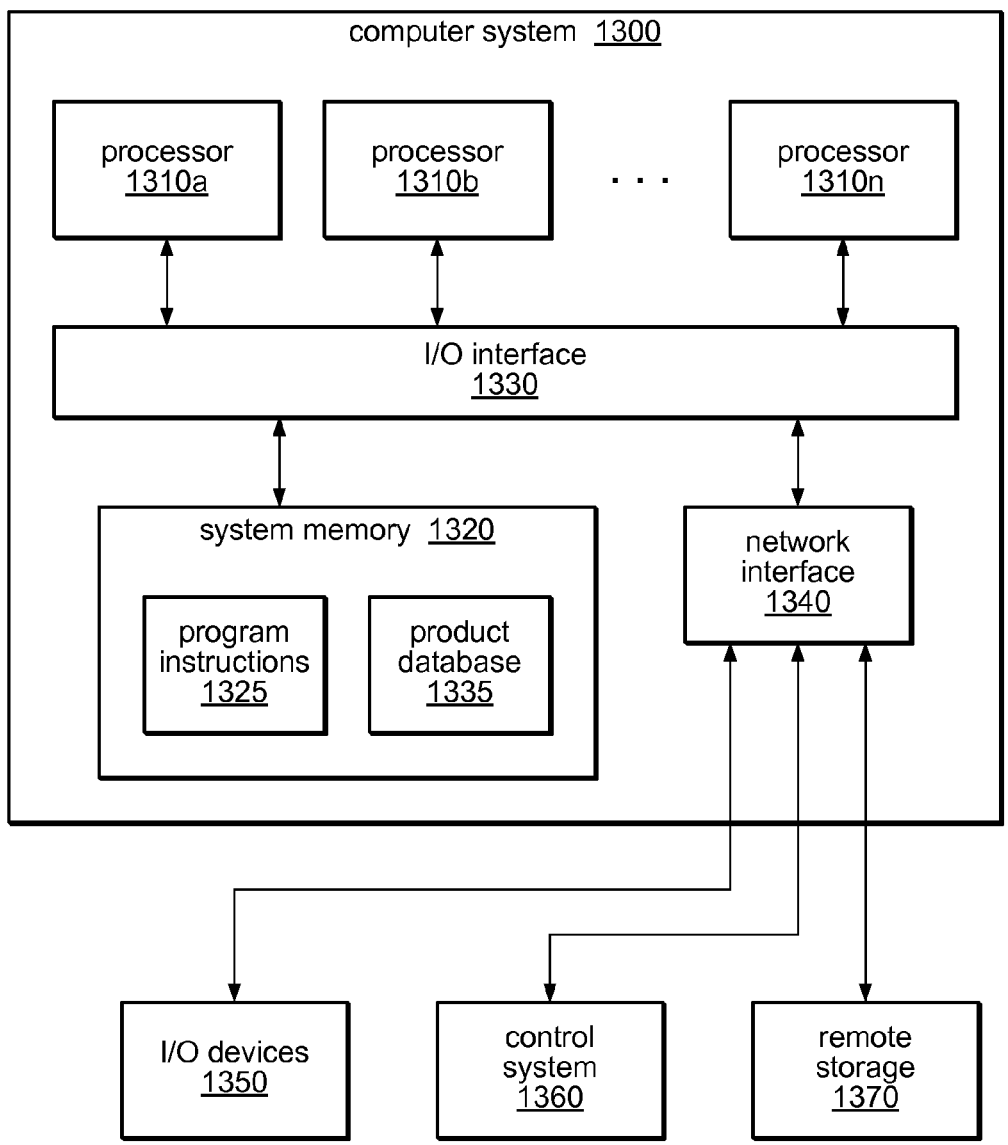
FIG. 13 is a block diagram illustrating a computer system suitable for use in a materials handling facility that employs light-based displays, according to one embodiment.

Any of various computer systems may be configured to implement the use of a light-based display system within a materials handling facility. For example, FIG. 13 is a block diagram illustrating one embodiment of a computer system suitable for implementing the system and methods described herein. In various embodiments, an order fulfillment control system (e.g., control system 900 of FIGS. 9A and 9B), a light-based display system (e.g., display system 940 of FIGS. 9A and 9B), or a communication device (e.g., communication device 450 illustrated in FIG. 4), may each include a general-purpose computer system such as computer system 1300 illustrated in FIG. 13.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330. In some embodiments, computer system 1300 may be illustrative of control system 900, while in other embodiments control system 900 may include more, fewer, or different elements than computer system 1300. In some embodiments, computer system 1300 may be illustrative of a display system 940, a display device (e.g., 310, 510, 610, or 710), or a communication device (e.g., 450, 550, or 750), while in other embodiments a light-based display system, display device, or communication device may include more, fewer, or different elements than computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor 1310. In various embodiments, system memory 1320 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for implementing an order fulfillment control system, a light-based display system or other visible light emission system, a mirror-based or liquid crystal based display system, or a communication device, are shown stored within system memory 1320 as program instructions 1325. Program instructions 1325 may in some embodiments include a software implementation of one or more counters, such a counter configured for tracking the number of items in each inventory area and/or for determining a position indicator (comprising a respective item count value) for each of the items stored in each inventory area. In some embodiments, system memory 1320 may include product database 1335, which may be configured as described herein (e.g., product database 910). In other embodiments, remote storage 1370 may include a product database instead of, or in addition to, system memory 1320. For example, the information described herein as being stored in a product database may be partitioned between a database included in system memory 1320 and one or more databases included on one or more remote storage devices 1370, in various embodiments.

In one embodiment, I/O interface 1330 may be configured to coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, for example. In particular, network interface 1340 may be configured to allow communication between computer system 1300 and various I/O devices 1350, control system 1360, and/or remote storage 1370. I/O devices 1350 may include light-based display devices making up a light-based display system and/or other communication devices, as described herein. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1300 via I/O interface 1330. A computer-readable storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

In one embodiment, the relationship between control system 1360 and I/O devices 1350 may be a server/client type of relationship. For example, control system 1360 may be configured as a server computer system 1300 that may convey instructions to and receive acknowledgements from I/O devices 1350. In such an embodiment, I/O devices 1350 may be relatively simple or "thin" client devices. For example, I/O devices 1350 may be configured as dumb terminals with display, data entry and communications capabilities, but otherwise little computational functionality. However, in some embodiments, I/O devices 1350 may be computer systems configured similarly to computer system 1300, including one or more processors 1310 and various other devices (though in some embodiments, a computer system 1300 implementing an I/O device 1350 may have somewhat different devices, or different classes of devices, compared to a computer system 1300 implementing control system 900). It is further contemplated that in some embodiments, the functionality of control system 900 may be distributed across some or all of I/O devices 1350. That is, in some embodiments, there may be no centralized point of control of the activity of materials handling facility agents; rather, I/O devices 1350 may function in a cooperative, distributed fashion to coordinate the activities of the materials handling facility.

In various embodiments, I/O devices 1350 (e.g., laser-baser display devices and other communication devices) may include, but are not limited to, one or more of: handheld devices, devices worn by or attached to the agents, and devices integrated into or mounted on any mobile or fixed equipment of the materials handling facility such as pushcarts, bins, totes, racks, shelves, tables, ceilings, walls, and work benches, according to various embodiments. I/O devices 1350 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 1360. In general, an I/O device 1350 may be any device that can communicate with control system 1360 and convey instructions to agents within the facility. In one embodiment, at least some of the I/O devices 1350 may be configured to scan or otherwise read or receive codes or identifiers of various components in the materials handling facility and to communicate the entered codes to control system 1360 for use in directing agents in the various operations of the facility (e.g., bar code scanners, RFID readers, cameras, or any other sensing devices). Such components may include, but are not limited to, one or more of items, orders, modular sorting stations, modular bins, and compartments of modular bins.

In one embodiment, as least some of the I/O devices 1350 may be configured as movable and/or adaptable mirrors, laser-based display devices and/or other light-based display devices, having the functionality described herein. More specifically, laser-based display devices, as described herein, may include devices employing vector-based laser technology (e.g., those having one horizontal and one vertical oscillating mirror), or raster-based laser technology (including MEMS technology and/or other techniques that include one mirror for each color), or any other suitable laser technology. Note that in some embodiments, a light-based display system may include one or more fixed-location, portable, or embedded projection display devices, or one or more wearable projection display devices, that utilize laser-based projection technology, light-based projection technology, or any other type of visible light emission technology. As described herein, in some embodiments, display devices employing a visible light emission technology may be used in combination with devices employing a MEMS technology or a Liquid Crystal on Silicon (LCoS) technology so that light emitted or projected by one display device is reflected by another device to produce a desired display. LCoS technology, for example, may be used to create an image by directing light projected by a light-based display device to a liquid crystal matrix, and controlling the amount of light that is reflected by the matrix.

Note that the display devices described herein may not be dedicated to performing the functionality described herein, but may also provide other functionality within the facility, e.g., at other times and/or for other purposes. In such embodiments, display devices usable to direct agents within the facility may be used to project other types of information when they are not being used to project the visual guidance and/or path information described herein, or they may be configured to project other types of information concurrently with projecting visual guidance and/or path information (e.g., using time-multiplexing). For example, these devices may be configured to present other types of information to particular agents (e.g., to relay a message from a supervisor or a messaging service to a particular agent), or to broadcast messages to two or more agents within the facility (e.g., presenting a company-wide, facility-wide, or group announcement, or presenting alerts and/or instructions in the case of an emergency). Such broadcast messages may be presented by all of the display devices in the facility, or only by devices in the vicinity of agents (or particular agents), in various embodiments.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more laser-based display devices located in a materials handling facility; and
a control system configured to communicate with the one or more laser-based display devices;
wherein the control system is further configured to provide data to at least one of the one or more laser-based display devices, wherein the at least one of the one or more laser-based display devices is distinct from the control system,
wherein the at least one of the one or more laser-based display devices is configured to utilize the data to project visual guidance onto a surface of the materials handling facility,
the visual guidance comprising path information directing the movement of an agent in the materials handling facility toward a targeted location within the materials handling facility along a particular path through the materials handling facility to the targeted location,
the path information including an indication of at least a portion of the path to the targeted location, and
wherein the surface onto which the visual guidance is projected is visible to the agent and is not at the targeted location.

2. The system of claim 1, wherein the targeted location is an inventory area within the materials handling facility at which the agent is to perform one or more inventory management operations.

3. The system of claim 2, wherein the one or more inventory management operations comprises stowing a given item or picking a given item.

4. The system of claim 1, wherein the control system is further configured to determine a current location of the agent within the materials handling facility, and wherein the data sent to the at least one of the one or more laser-based display devices is dependent on the current location of the agent.

5. The system of claim 1, wherein the path comprises a shortest path from a current location of the agent to the targeted location.

6. The system of claim 1, wherein the control system is further configured to provide item-specific data to at least one of the one or more laser-based display devices, wherein the item-specific data is for projection of additional visual guidance to the agent comprising information usable by the agent to identify a given item stored at the targeted location.

7. The system of claim 1, wherein the control system is further configured to provide item-specific data to at least one of the one or more laser-based display devices, wherein the item-specific data is for projection of additional visual guidance to the agent comprising information usable by the agent to identify a position at which a given item should be stowed at the targeted location.

8. The system of claim 1, wherein the control system is further configured to provide projection instructions to at least one of the one or more laser-based display devices configured to effect one or more of:
   selection of the at least one of the laser-based display devices to project the visual guidance,
   orientation of the at least one of the laser-based display devices when projecting the visual guidance,
   a projection angle of the at least one of the laser-based display devices when projecting the visual guidance,
   selection of one or more mirrors toward which to direct the visual guidance,
   a format of the projected visual guidance,
   a duration of the projection of the visual guidance,
   initiation of the projection of the visual guidance, or
   cessation of the projection of the visual guidance.

9. The system of claim 1,
   wherein the visual guidance projected by the at least one of the one or more laser-based display devices is visible to a plurality of agents who are performing different inventory management operations in the materials handling facility;
   wherein the control system is further configured to provide agent-specific data to the at least one of the one or more laser-based display devices; and
   wherein the visual guidance includes agent-specific visual guidance usable to direct the agent to the targeted location.

10. The system of claim 1, wherein the control system is further configured to provide additional data to the at least one of the one or more laser-based display devices, wherein the additional data is for projection of additional visual guidance usable to direct a second agent to a second location within the materials handling facility concurrently with the at least one of the one or more laser-based display devices projecting the visual guidance.

11. The system of claim 1, wherein the one or more laser-based display devices are configured to project the visual guidance on one or more of: a reflective element, a refractive element, a floor, a wall, a shelving unit, a container, a bin, an item, or a ceiling of the materials handling facility.

12. The system of claim 1, wherein the one or more laser-based display devices are configured to utilize one or more of: a vector-based laser display technology, a raster-based laser display technology, or a MicroElectroMechanical Systems (MEMS) technology.

13. The system of claim 1, wherein the one or more laser-based display devices comprise at least one device that is movable to different locations within the materials handling facility during use.

14. The system of claim 1, further comprising one or more reflective or refractive elements located in the materials handling facility;
   wherein the one or more reflective or refractive elements are configured to receive instructions from the control system; and
   wherein the control system is further configured to:
      provide instructions to the at least one of the one or more laser-based display devices to direct light projected therefrom to at least one of the one or more reflective or refractive elements as part of said projection of the visual guidance; and
      provide instructions to the at least one of the one or more reflective or refractive elements to effect one or more of:
         selection of the at least one of the reflective or refractive elements to which the projected light is directed,
         orientation of the at least one of the reflective or refractive elements when reflecting or refracting the projected light,
         an angle of the at least one of the reflective or refractive elements when reflecting or refracting the projected light,
         a sequence of positions assumed by the at least one of the reflective or refractive elements when reflecting or refracting the projected light, or
         an amount of light reflected by the at least one of the reflective or refractive elements when reflecting or refracting the projected light.

15. The system of claim 1, wherein the control system is further configured to provide item-specific data to at least one of the one or more laser-based display devices, wherein the item-specific data is for projection of additional visual guidance to the agent comprising information usable by the agent to identify a position at which a given item is stored at the targeted location.

16. The system of claim 1, wherein the control system is further configured to:
   store, in a database, respective location information associated with each of a plurality of items handled in the facility, wherein the respective location information associated with each of the plurality of items indicates one or more of: a location at which the item was stowed or a location at which the item is to be stowed; and
   access the database to determine the data to provide to the at least one of the one or more laser-based display devices.

17. The system of claim 1, wherein the one or more laser-based display devices are mounted at fixed locations in the materials handling facility.

18. The system of claim 1, wherein the control system is further configured to, prior to said providing data, calibrate a location of the at least one of the one or more laser-based display devices with respect to one or more references in the materials handling facility whose locations are known.

19. The system of claim 1, wherein the control system is further configured to, prior to said providing data, calibrate a location of the agent with respect to one or more references in the materials handling facility whose locations are known.

20. A method, comprising:
providing, by a computer, data to at least one of one or more laser-based display devices located in a materials handling facility, wherein the at least one of the one or more laser-based display devices is distinct from the computer; and
utilizing the data, by the at least one of the one or more laser-based display devices, the data to project visual guidance onto a surface of the materials handling facility,
the visual guidance comprising path information directing the movement of an agent in the materials handling facility toward a targeted location within the materials handling facility along a particular path through the materials handling facility to the targeted location,
the path information including an indication of at least a portion of the path to the targeted location, and
wherein the surface onto which the visual guidance is projected is visible to the agent and is not at the targeted location.

21. The method of claim 20, wherein the targeted location is an inventory area within the materials handling facility at which the agent is to perform one or more inventory management operations.

22. The method of claim 21, wherein the one or more inventory management operations comprises stowing a given item or picking a given item.

23. The method of claim 20,
wherein the method further comprises determining a current location of the agent within the materials handling facility; and
wherein the data sent to the at least one of the one or more laser-based display devices is dependent on the current location of the agent.

24. The method of claim 20, wherein the path comprises a shortest path from a current location of the agent to the targeted location.

25. The method of claim 20, further comprising providing item-specific data to at least one of the one or more laser-based display devices, wherein the item-specific data is for projection of additional visual guidance to the agent comprising information usable by the agent to identify a given item stored at the targeted location.

26. The method of claim 20, further comprising providing item-specific data to at least one of the one or more laser-based display devices, wherein the item-specific data is for projection of additional visual guidance to the agent comprising information usable by the agent to identify a position at which a given item should be stowed at the targeted location.

27. The method of claim 20, further comprising providing projection instructions to at least one of the one or more laser-based display devices configured to effect one or more of:
selection of the at least one of the laser-based display devices to project the visual guidance,
orientation of the at least one of the laser-based display devices when projecting the visual guidance,
a projection angle of the at least one of the laser-based display devices when projecting the visual guidance,
selection of one or more mirrors toward which to direct the visual guidance,
a format of the projected visual guidance,
a duration of the projection of the visual guidance,
initiation of the projection of the visual guidance, or
cessation of the projection of the visual guidance.

28. The method of claim 20,
wherein the visual guidance projected by the at least one of the one or more laser-based display devices is visible to a plurality of agents who are performing different inventory management operations in the materials handling facility;
wherein the method further comprises providing agent-specific data to the at least one of the one or more laser-based display devices; and
wherein the visual guidance includes agent-specific visual guidance usable to direct the agent to the targeted location.

29. The method of claim 20, further comprising providing additional data to the at least one of the one or more laser-based display devices, wherein the additional data is for projection of additional visual guidance usable to direct a second agent to a second location within the materials handling facility concurrently with the at least one of the one or more laser-based display devices projecting the visual guidance.

30. The method of claim 20, wherein the one or more laser-based display devices are configured to project the visual guidance on one or more of: a reflective element, a refractive element, a floor, a wall, a shelving unit, a container, a bin, an item, or a ceiling of the materials handling facility.

31. The method of claim 20, wherein the one or more laser-based display devices are configured to utilize one or more of: a vector-based laser display technology, a raster-based laser display technology, or a MicroElectroMechanical Systems (MEMS) technology.

32. The method of claim 20, wherein the one or more laser-based display devices comprise at least one device that is movable to different locations within the materials handling facility during use.

33. The method of claim 20, further comprising:
providing instructions to the at least one of the one or more laser-based display devices to direct light projected therefrom to at least one of one or more reflective or refractive elements located in the materials handling facility as part of said projection of the visual guidance; and
providing instructions to the at least one of the one or more reflective or refractive elements to effect one or more of:
selection of the at least one of the reflective or refractive elements to which the projected light is directed,
orientation of the at least one of the reflective or refractive elements when reflecting or refracting the projected light,
an angle of the at least one of the reflective or refractive elements when reflecting or refracting the projected light,
a sequence of positions assumed by the at least one of the reflective or refractive elements when reflecting or refracting the projected light, or
an amount of light reflected by the at least one of the reflective or refractive elements when reflecting or refracting the projected light.

34. The method of claim 20, further comprising providing item-specific data to at least one of the one or more laser-based display devices, wherein the item-specific data is for projection of additional visual guidance to the agent comprising information usable by the agent to identify a position at which a given item is stored at the targeted location.

35. The method of claim 20, further comprising:
storing, in a database, respective location information associated with each of a plurality of items handled in the facility, wherein the respective location information associated with each of the plurality of items indicates one or more of: a location at which the item was stowed or a location at which the item is to be stowed; and accessing the database to determine the data to provide to the at least one of the one or more laser-based display devices.

36. The method of claim 20, wherein the one or more laser-based display devices are mounted at fixed locations in the materials handling facility.

37. The method of claim 20, further comprising, prior to said providing data, calibrating a location of the at least one of the one or more laser-based display devices with respect to one or more references in the materials handling facility whose locations are known.

38. The method of claim 20, further comprising, prior to said providing data, calibrating a location of the agent with respect to one or more references in the materials handling facility whose locations are known.

39. A non-transitory, computer readable storage medium, storing program instructions that when executed on one or more computers cause the one or more computers to perform:

providing data to at least one of one or more laser-based display devices located in a materials handling facility, wherein the at least one of the one or more laser-based display devices is distinct from the one of the one or more computers;

wherein the at least one of the one or more laser-based display devices is configured to utilize the data is to project visual guidance onto a surface of the materials handling facility, the visual guidance comprising path information directing the movement of an agent in the materials handling facility toward a targeted location within the materials handling facility along a particular path through the materials handling facility to the targeted location, the path information including an indication of at least a portion of the path to the targeted location, and wherein the surface onto which the visual guidance is projected is visible to the agent and is not at the targeted location.

40. The storage medium of claim 39, wherein the targeted location is an inventory area within the materials handling facility at which the agent is to perform one or more inventory management operations.

41. The storage medium of claim 40, wherein the one or more inventory management operations comprises stowing a given item or picking a given item.

42. The storage medium of claim 39, wherein when executed on the one or more computers, the program instructions further cause the one or more computers to perform determining a current location of the agent within the materials handling facility; and wherein the data sent to the at least one of the one or more laser-based display devices is dependent on the current location of the agent.

43. The storage medium of claim 39, wherein the path comprises a shortest path from a current location of the agent to the targeted location.

44. The storage medium of claim 39, wherein when executed on the one or more computers, the program instructions further cause the one or more computers to perform providing item-specific data to at least one of the one or more laser-based display devices, wherein the item-specific data is for projection of additional visual guidance to the agent comprising information usable by the agent to identify a given item stored at the targeted location.

45. The storage medium of claim 39, wherein when executed on the one or more computers, the program instructions further cause the one or more computers to perform providing item-specific data to at least one of the one or more laser-based display devices, wherein the item-specific data is for projection of additional visual guidance to the agent comprising information usable by the agent to identify a position at which a given item should be stowed at the targeted location.

46. The storage medium of claim 39, wherein when executed on the one or more computers, the program instructions further cause the one or more computers to perform providing projection instructions to at least one of the one or more laser-based display devices configured to effect one or more of:

selection of the at least one of the laser-based display devices to project the visual guidance, orientation of the at least one of the laser-based display devices when projecting the visual guidance, a projection angle of the at least one of the laser-based display devices when projecting the visual guidance, selection of one or more mirrors toward which to direct the visual guidance, a format of the projected visual guidance, a duration of the projection of the visual guidance, initiation of the projection of the visual guidance, or cessation of the projection of the visual guidance.

47. The storage medium of claim 39, wherein the visual guidance projected by the at least one of the one or more laser-based display devices is visible to a plurality of agents who are performing different inventory management operations in the materials handling facility;

wherein when executed on the one or more computers, the program instructions further cause the one or more computers to perform providing agent-specific data to the at least one of the one or more laser-based display devices; and wherein the visual guidance includes agent-specific visual guidance usable to direct the agent to the targeted location.

48. The storage medium of claim 39, wherein when executed on the one or more computers, the program instructions further cause the one or more computers to perform providing additional data to the at least one of the one or more laser-based display devices, wherein the additional data is for projection of additional visual guidance usable to direct a second agent to a second location within the materials handling facility concurrently with the at least one of the one or more laser-based display devices projecting the visual guidance.

49. The storage medium of claim 39, wherein the one or more laser-based display devices are configured to project the visual guidance on one or more of: a reflective element, a refractive element, a floor, a wall, a shelving unit, a container, a bin, an item, or a ceiling of the materials handling facility.

50. The storage medium of claim 39, wherein the one or more laser-based display devices are configured to utilize one or more of: a vector-based laser display technology, a raster-based laser display technology, or a MicroElectroMechanical Systems (MEMS) technology.

51. The storage medium of claim 39, wherein the one or more laser-based display devices comprise at least one device that is movable to different locations within the materials handling facility during use.

52. The storage medium of claim 39, wherein when executed on the one or more computers, the program instructions further cause the one or more computers to perform:

providing instructions to the at least one of the one or more laser-based display devices to direct light projected therefrom to at least one of one or more reflective or refractive elements located in the materials handling facility as part of said projection of the visual guidance; and providing instructions to the at least one of the one or more reflective or refractive elements to effect one or more of:

selection of the at least one of the reflective or refractive elements to which the projected light is directed, orientation of the at least one of the reflective or refractive elements when reflecting or refracting the projected light, an angle of the at least one of the reflective or refractive elements when reflecting or refracting the projected light, a sequence of positions assumed by the at least one of the reflective or refractive elements when reflecting or refracting the projected light, or an amount of light reflected by the at least one of the reflective or refractive elements when reflecting or refracting the projected light.

53. The storage medium of claim 39, wherein when executed on the one or more computers, the program instructions further cause the one or more computers to perform providing item-specific data to at least one of the one or more laser-based display devices, wherein the item-specific data is for projection of additional visual guidance to the agent comprising information usable by the agent to identify a position at which a given item is stored at the targeted location.

54. The storage medium of claim 39, wherein when executed on the one or more computers, the program instructions further cause the one or more computers to perform:

storing, in a database, respective location information associated with each of a plurality of items handled in the facility, wherein the respective location information associated with each of the plurality of items indicates one or more of: a location at which the item was stowed or a location at which the item is to be stowed; and accessing the database to determine the data to provide to the at least one of the one or more laser-based display devices.

55. The storage medium of claim 39, wherein the one or more laser-based display devices are mounted at fixed locations in the materials handling facility.

56. The storage medium of claim 39, wherein when executed on the one or more computers, the program instructions further cause the one or more computers to perform, prior to said providing data, calibrating a location of the at least one of the one or more laser-based display devices with respect to one or more references in the materials handling facility whose locations are known.

57. The storage medium of claim 39, wherein when executed on the one or more computers, the program instructions further cause the one or more computers to perform, prior to said providing data, calibrating a location of the agent with respect to one or more references in the materials handling facility whose locations are known.

\* \* \* \* \*